(12) United States Patent
Scheiblecker et al.

(10) Patent No.: US 11,221,070 B2
(45) Date of Patent: Jan. 11, 2022

(54) ACTUATION DEVICE FOR ACTUATING AN EMERGENCY RELEASE OF THE TRANSMISSION OF A MOTOR VEHICLE, IN PARTICULAR OF A CAR

(71) Applicant: AUDI AG, Ingolstadt (DE)

(72) Inventors: Georg Scheiblecker, Kipfenberg-Böhming (DE); Bodo Wilke, Hitzhofen (DE); Maximilian Steffan, Eldingen (DE); Iris Puckelwaldt, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/767,267

(22) PCT Filed: Nov. 26, 2018

(86) PCT No.: PCT/EP2018/082601
§ 371 (c)(1),
(2) Date: May 27, 2020

(87) PCT Pub. No.: WO2019/102012
PCT Pub. Date: May 31, 2019

(65) Prior Publication Data
US 2020/0355268 A1 Nov. 12, 2020

(30) Foreign Application Priority Data
Nov. 27, 2017 (DE) ...................... 10 2017 221 198.9

(51) Int. Cl.
*F16H 63/34* (2006.01)
*B60K 20/02* (2006.01)

(52) U.S. Cl.
CPC ......... *F16H 63/3491* (2013.01); *B60K 20/02* (2013.01); *F16H 63/3433* (2013.01)

(58) Field of Classification Search
CPC . F16H 63/3491; F16H 63/3433; B60K 20/02; B60T 1/005
See application file for complete search history.

(56) References Cited

U.S. PATENT DOCUMENTS

| 2009/0151501 | A1 | 6/2009 | Jung et al. |
| 2011/0132121 | A1* | 6/2011 | Park ................... F16H 63/3466 74/473.12 |
| 2017/0030465 | A1* | 2/2017 | Dearden ............. F16H 63/3491 |

FOREIGN PATENT DOCUMENTS

| CN | 103958945 A | 7/2014 |
| DE | 102 41 877 A1 | 3/2004 |

(Continued)

OTHER PUBLICATIONS

German Examination Report dated Aug. 17, 2018 in corresponding German Application No. 10 2017 221 198.9; 10 pages; Machine translation attached.

(Continued)

*Primary Examiner* — Mark A Manley
(74) *Attorney, Agent, or Firm* — Maier & Maier, PLLC

(57) ABSTRACT

The disclosure relates to an actuating device for actuating an emergency release of a transmission, including a parking lock, which transmission is mechanically locked by the parking lock when the parking lock is activated, of a motor vehicle, having at least one vehicle-fixed actuating element, by which the parking lock is manually and mechanically deactivatable, and having a tool formed separately from the actuating element via which the actuating element is manually and mechanically actuatable to manually deactivate the parking lock, wherein the actuating element comprises a roller rotatable around an axis of rotation which is rotatable around the axis of rotation by the tool to thus actuate the actuating element.

18 Claims, 17 Drawing Sheets

(56) References Cited

FOREIGN PATENT DOCUMENTS

| | | |
|---|---|---|
| DE | 10 2008 036 971 B3 | 10/2009 |
| DE | 10 2009 019 812 A1 | 11/2010 |
| DE | 10 2011 119 747 A1 | 6/2013 |
| DE | 10 2012 012 673 A1 | 12/2013 |
| JP | 2013-127264 A | 6/2013 |
| WO | WO2017/200535 | * 11/2017 |
| WO | WO2017200535 | * 11/2017 |

OTHER PUBLICATIONS

German Examination Report dated Jan. 14, 2019 in corresponding German Application No. 10 2017 221 198.9; 6 pages; Machine translation attached.
International Search Report with English translation and Written Opinion with Machine translation dated Feb. 1, 2019 in corresponding International Application No. PCT/EP2018/082601; 19 pages.
Chinese Office Action dated Jan. 14, 2021, in connection with corresponding CN Application No. 201880076348.5 (13 pp., including machine-generated English translation).
International Preliminary Report on Patentability (Chapter 1) dated Jun. 11, 2020, in corresponding application No. PCT/EP2018/082601, 9 pages.
Chinese Office Action dated Aug. 26, 2021, in connection with corresponding CN Application No. 201880076348.5 (14 pp., including machine-generated English translation).

* cited by examiner

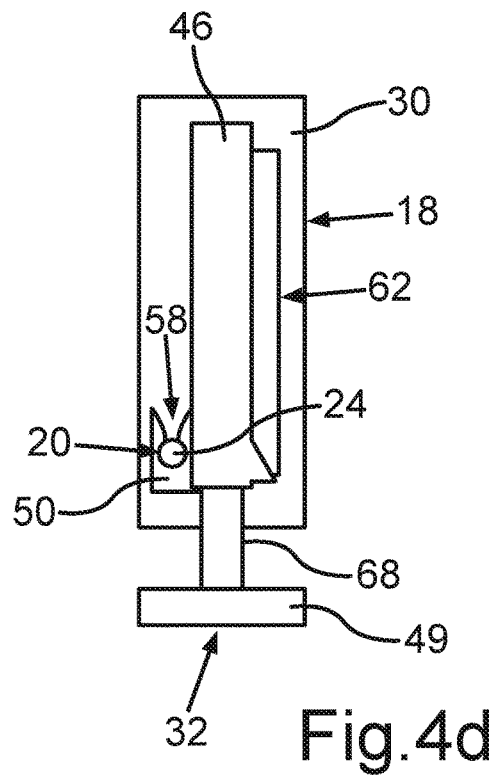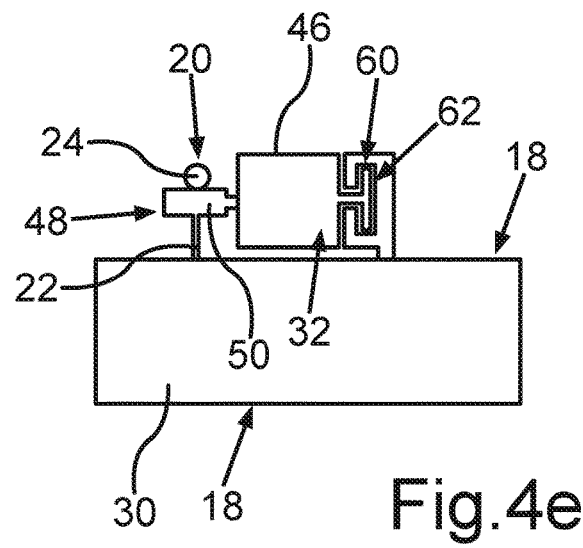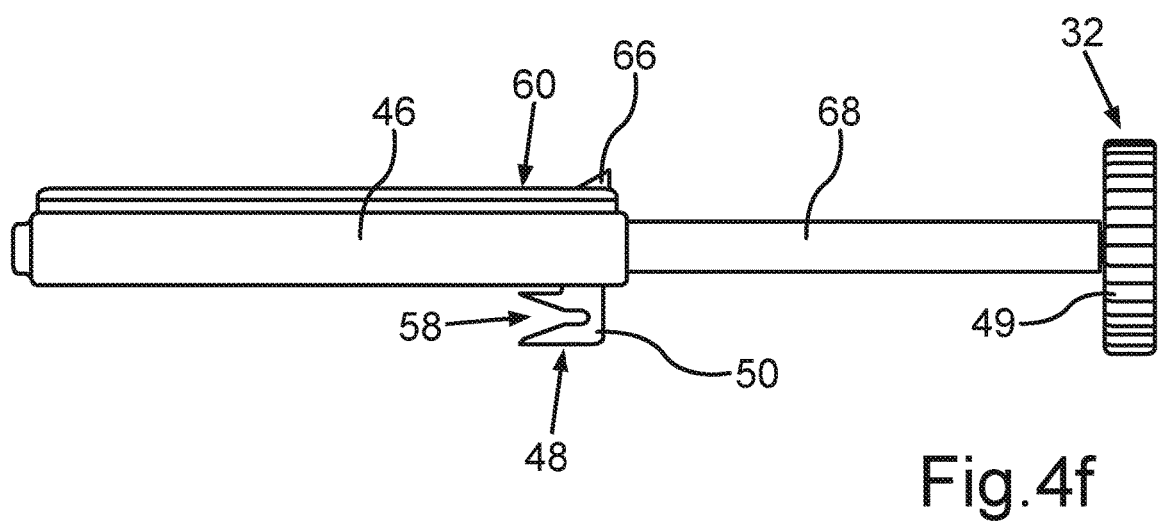

ACTUATION DEVICE FOR ACTUATING AN EMERGENCY RELEASE OF THE TRANSMISSION OF A MOTOR VEHICLE, IN PARTICULAR OF A CAR

FIELD

The disclosure relates to an actuating device for actuating an emergency release of a transmission of a motor vehicle, in particular of a car.

BACKGROUND

Such an actuating device for actuating an emergency release of a transmission, which comprises a parking lock, of a motor vehicle is known, for example, from DE 10 2011 119 747 A1. The transmission can be designed as an automatic transmission and, when the parking lock is activated, is mechanically blocked by means of the parking lock. This is particularly to be understood to mean that, for example, a transmission output shaft of the transmission is secured against a rotation in relation to a housing of the transmission. Thus, for example, the motor vehicle can be secured against undesired rolling away, in particular if the motor vehicle is stopped and/or parked on a slope.

The actuating device comprises at least one vehicle-fixed actuating element, by means of which the parking lock is deactivatable manually and thus, for example, by a person. The actuating device further comprises a tool formed separately from the actuating element, via which the actuating element is manually and mechanically actuatable to manually deactivate the parking lock. The tool is, for example, initially spaced from the actuating element and can in particular be so moved relative to the actuating element, that the tool in cooperation with the actuating element can be brought. As a result, for example, the actuating element can be actuated manually via the tool by said person, whereby the person can manually deactivate the parking lock.

Furthermore, DE 102 41 877 A1 discloses a driving speed selection device for an automatic transmission of a motor vehicle, which has a positioning element, a drive element, a further drive element, at least one actuating lever, and an emergency actuating device.

Moreover, DE 10 2009 019 812 A1 discloses a vehicle having a transmission, which can assume various driving states, a neutral state, and a parking state, since the transmission is blocked in the parking state by a blocking element. In addition, a manually actuatable emergency release device is provided, by the actuation of which the transmission can be unlocked in case of a malfunction.

SUMMARY

An exemplary object of the present disclosure is to provide an actuating device, so that a transmission of a motor vehicle can be particularly easily unlocked manually and mechanically.

The disclosure relates to an actuating device for actuating an emergency release of a transmission of a motor vehicle, in particular of a car, and in this case preferably of a passenger vehicle. The transmission is designed, for example, as an automatic transmission, in particular as a torque converter automatic transmission, and comprises a parking lock. If the parking lock is activated, the transmission is thus mechanically locked by means of the parking lock. In this way, for example, the motor vehicle can be secured against undesired rolling away, in particular if the motor vehicle is stopped and/or parked on a slope.

The transmission can typically be actuated via shift-by-wire, so that in particular the parking lock can at least be disengaged or deactivated via shift-by-wire. This is to be understood in particular to mean that usually an actuator, in particular an electrically operable actuator is provided, wherein the parking lock can at least be deactivated by means of the actuator. If a signal, in particular an electrical signal, for deactivating the parking lock is detected, for example, the parking lock is thus deactivated by means of the actuator. However, if a malfunction occurs, in particular a power failure, so that the parking lock can no longer be electrically deactivated by means of the actuator, the parking lock can thus be manually and mechanically deactivated by means of the emergency release of the transmission. In this way, the motor vehicle can be moved even in the event of the malfunction and, for example, towed away, without damage occurring. The emergency release of the transmission is in this case, for example, part of the actuator or vice versa, so that, for example, the parking lock can be deactivated via the actuator means of the emergency release of the transmission.

The actuating device in this case comprises at least one vehicle-fixed actuating element, which is held on the motor vehicle and is thus a permanent part of the motor vehicle. By means of the actuating element, the parking lock can be manually and in particular mechanically deactivated, for example, by a person. Moreover, the actuating device comprises a tool formed separately from the actuating element, via which the actuating element is manually and mechanically actuatable to manually deactivate the parking lock. The feature that the tool is formed separately from the actuating element is to be understood in particular to mean that the tool and the actuating element are two components formed separately from one another and are thus respective components, which are not, for example, integrally formed with one another. For example, in a starting state the actuating element is spaced apart from the tool or vice versa, wherein, for example, the tool can be brought and/or moved into interaction with the actuating element to thus manually and mechanically actuate the actuating element via the tool and as a result to deactivate the parking lock.

To be able to manually and mechanically deactivate the parking lock in a particularly simple manner, it is provided according to the invention that the actuating element comprises a roller rotatable around an axis of rotation, which is rotatable by means of the tool to actuate the actuating element and thus deactivate the parking lock. Due to the use of the roller, a particularly advantageous gear ratio can be displayed, via which the actuating element can be actuated particularly easily, i.e., with particularly little effort mechanically and, for example, manually by a person, whereby the parking lock can be deactivated easily and conveniently.

To rotate the roller, for example, the tool, which comprises a push rod or is formed as a push rod, is firstly translationally moved in relation to the roller and moved toward the roller at the same time. The translational movement of the tool causes, for example, a rotation of the roller around the axis of rotation, in particular in that the tool firstly comes into interaction and/or into supporting contact with the roller due to its translational movement. If the tool is then moved further translationally, the roller is thus rotated around the axis of rotation, so that the rotation of the roller around the axis of rotation at least temporarily simultaneously accompanies the translational movement of the tool.

Furthermore, it is conceivable that to deactivate the parking lock, the tool is firstly moved translationally in relation to the roller and moved toward the roller at the same time. In this case, for example, the tool is firstly moved in interaction with the roller, in particular in such a way that the tool is coupled in a torque-transmitting manner to the roller, in particular in a reversibly releasable manner. This torque-transmitting coupling can take place, for example, in a friction-locked and/or formfitting manner. In other words, it is preferably provided that the tool is first moved translationally in relation to the roller and is moved toward the roller at the same time, whereby, for example, the tool is firstly brought into formfitting interaction with the roller, i.e., coupled to the roller in a formfitting manner. If the tool is then rotated around the axis of rotation, for example, while the tool interacts in a formfitting manner with the roller, the rotation of the tool around the axis of rotation thus causes a rotation of the roller around the axis of rotation, so that the rotation of the tool around the axis of rotation is at least temporarily simultaneously accompanied by a rotation of the roller around the axis of rotation. In other words, the tool is rotated and via this the roller is rotated simultaneously and/or jointly, whereby the actuating element is actuated and as a result the parking lock is deactivated in a simple and comfortable manner.

In one advantageous design of the invention, the actuating device comprises at least one through opening, which is formed in a center console that can be arranged or is arranged in the interior of the motor vehicle. In other words, the through opening of the actuating means is a through opening of the center console, which is arranged in particular in the completely produced state of the motor vehicle state of the motor vehicle in the interior thereof. The through opening in this case has a passage direction, which, in particular in the installed location of the center console and/or the actuating device, extends or can extend in a plane spanned by the vehicle transverse direction and the vehicle longitudinal direction. The center console assumes its installed location in this case in the completely produced state of the motor vehicle, wherein the center console is arranged in the interior thereof in the completely produced state of the motor vehicle. The passage direction of the through opening is a direction along which, for example, a fluid such as a gas or a narrow object such as a tool can or could be inserted through the through opening. In particular, the passage direction extends, for example, at least substantially perpendicular to a through plane in which the through opening extends. The through plane is spanned, for example, by the vehicle longitudinal direction and the vehicle vertical direction.

The through opening can be penetrated in this case by the tool, to thus bring the tool into interaction with the roller, thereby rotate the roller around the axis of rotation, and thus deactivate the parking lock. In other words, for example, to actuate the actuating element and thus deactivate the parking lock, the tool is, for example, pushed through the through opening along the passage direction and thus inserted through, to thus bring the tool, in particular in the above-described manner, into interaction with the actuating element and in particular with the roller. If the tool is then, for example, inserted further through the passage opening and/or rotated around the axis of rotation, the roller is thus rotated around the axis of rotation, in particular in relation to the center console, whereby the actuating element is actuated and the parking lock is deactivated.

The through opening can be penetrated by the tool along the passage direction. In other words, the tool can penetrate the through opening along the passage direction. Expressed in still other words, for example, the tool penetrates the through opening along the passage direction in at least one state, in which the parking lock is deactivated by means of the tool. The through hole can be penetrated along the passage direction by the tool, to thus bring the tool into engagement with the actuating element, to thereby mechanically actuate the mechanical actuator, and thus deactivate the parking lock. In this way it is possible to release the parking lock from the interior of the motor vehicle, so that the parking lock can be released particularly conveniently and easily by a person located in the interior. In the installed position and/or in the completely produced state of the motor vehicle, the through opening opens, for example, on one side or in one end into the interior of the motor vehicle, so that, for example, a person located in the interior can actuate the tool from the interior in order to deactivate the parking lock from the interior. On the other side or the other end, for example, the through opening opens into a region which is arranged outside the interior and at the same time on a side of the center console facing away from the interior, wherein the actuating element and/or the transmission is arranged in the region, for example. The tool can extend in this case, for example, along the passage direction from the interior through the through opening into the region, so that the actuating element can be manually actuated via the tool from the interior. In this way, the parking lock can be manually and mechanically deactivated in a particularly simple manner, whereby the transmission is released.

It has been shown to be particularly advantageous if the passage direction extends in the vehicle transverse direction. Therefore, for example, the tool can be inserted through the through opening in the vehicle transverse direction and thus brought into interaction with the actuating element, to actuate the actuating element as a result. In this manner, the parking lock can be deactivated and/or released particularly simply.

It has proven to be particularly advantageous if the tool is formed as a tool separate from the center console, which is insertable along the passage direction through the through hole to thus bring the tool into interaction with the actuating element, to thus mechanically actuate the actuating element and thus deactivate the parking lock. This is to be understood in particular to mean that the tool is not held on the center console, in particular not on the motor vehicle as a whole, but rather the tool is, for example, part of a vehicle toolkit, which can be moved around by a person freely in relation to the motor vehicle and in particular in relation to the center console. In this way, the tool can, for example, be stored in a particularly advantageous manner. To deactivate the parking lock, the tool is moved, for example, by the person in relation to the center console and in relation to the actuating element, in particular in such a way that the tool is pushed or inserted along the passage direction through the through opening. In this way, the tool can be brought into interaction with the actuating element to thus actuate the actuating element and as a result deactivate the parking lock.

The invention is based in particular on the following finding: In many current vehicle projects or motor vehicles, a mechanical connection between a shift actuator designed as a selector lever, for example, and a transmission of the respective motor vehicle is omitted. Instead, for example, commands of the driver of the respective motor vehicle are transmitted via an operating element, designed, for example, as a shift-by-wire operating element, to the transmission electronically, i.e., without mechanical connection between the operating element and the transmission. A mechanical implementation of the commands is performed, for example, via actuators, which receive signals characterizing the commands and convert them accordingly into movements. In recent developments, for example, electrical signals are transmitted from an actuator, in particular having a gear ratio, via a cable pull to the transmission by means of the shift actuator. In the event of a power failure, which can occur, for example, if a battery of the motor vehicle is disconnected, the transmission locks automatically in that its parking lock is activated. Undesired rolling away of the motor vehicle is then not possible. To release the parking lock, the emergency release of the transmission is provided, in particular with or without a gear ratio, which engages, for example, at the mentioned actuator or directly at the transmission.

In current transmissions, the manual deactivation of the parking lock, also referred to as emergency release, typically takes place via a cable pull or via a loop which can be, for example, part of the mentioned actuator and the emergency release of the transmission. The cable pull or the loop, respectively, actuates an internal emergency release mechanism of the actuator and is typically arranged above the actuator and can thus be actuated in the vehicle vertical direction. To get to such a release, usually a panel of a center console has to be removed. The cable pull or the loop, respectively, can then be moved into a release position, to thus deactivate the parking lock. The release position is to be held to keep the parking lock deactivated. The release position is held, for example, by applying tension to the cable pull or the loop, respectively, manually by a person or a corresponding pin tool. To activate the parking lock, for example, the cable pull or the loop, respectively, is relaxed and/or the pin tool is removed.

A force of up to 120 N is typically required for the actuation of the cable pull or the loop, respectively. Whether a power gear ratio should be integrated in the emergency release results from gear ratio options in the actuator.

Since it is now provided according to the invention that the parking lock can be manually and mechanically deactivated via the through opening of the center console and thus from the interior of the motor vehicle, a person deactivating the parking lock can simultaneously actuate, for example, a brake operating element designed as a brake pedal, for example, during the deactivation of the parking lock, to thus, for example, activate a service brake of the motor vehicle. Undesired rolling away of the motor vehicle can thus be at least temporarily avoided in spite of the deactivation of the parking lock. Furthermore, for example, rolling away or movement of the motor vehicle after the deactivation of the parking lock can be intentionally controlled by the person via the service brake. Due to the option of releasing the parking lock via the through opening of the center console, the actuating device can be arranged within reach of the driver, so that the driver can deactivate the parking lock and simultaneously actuate the service brake.

Furthermore, it is possible in the actuating device according to the invention to apply even large forces required for activating the parking lock in a simple manner, in particular via a gear ratio. The following disadvantages have been identified in particular in conventional emergency releases of transmissions:

Design incompatibility; access through the center console is to be ensured, for example, via storage compartments or beverage holders, since otherwise a removal of the center console is necessary to reach the emergency release. There is thus no direct access to the emergency release. Moreover, damage to the panels to be removed cannot be precluded.

Depending on the design specification, an asymmetric design of the center console in the region of the actuator is implementable only in a costly manner or not at all. A provision of right-hand/left-hand variants is also required.

The unlocking position is supposed to be fixed with the aid of a separate pin tool or by permanent, manual fixing.

The unlocking position is not apparent at first glance and can be forgotten under certain circumstances.

The entire unlocking force has to be applied manually.

High expenditure for functional integration into the motor vehicle.

constructively complex measures complex, costly laying of cable pulls complex, costly maintenance solutions Uniform modules for different derivatives, for example, front-engine, rear-engine, or middle-engine concepts are not possible.

The above-mentioned disadvantages can now be avoided by means of the actuating device according to the invention, since the parking lock can be deactivated with the aid of the tool, which is designed as part of a vehicle toolkit, for example, via the through opening. The through opening can in this case represent a design-neutral access, in particular laterally on the center console and in this case, for example, at the height of a seat rail screw connection, wherein the parking lock can be deactivated, held, and then reactivated particularly simply via the through opening.

The through opening can be associated, for example, with a cover element designed in particular as a lid or the like, by means of which the through opening is closable or closed, in particular completely. For example, to deactivate the parking lock, the cover element is removed, whereby the cover element exposes the through opening. Subsequently thereto, the tool can be brought into interaction with the actuating element via the through opening. Subsequently thereto, for example, the tool can be removed from the through opening, whereupon the through opening can be closed again by means of the cover element. Depending on the embodiment, for example, an actuating mechanism for actuating the actuating element can be integrated into the tool or arranged as a separate component on the actuator. The actuating mechanism provides, for example, a gear ratio different from 1, by means of which forces or torques exerted by a person on the tool can be converted into higher forces or torques, respectively, in relation thereto. Even minor forces or torques exerted by the person on the tool are thus sufficient to actuate the actuating element and as a result to deactivate the parking lock.

The actuating element comprises, for example, a traction means, in particular in the form of a cable pull, which is also referred to as a Bowden cable, a cable, a band, a flex shaft, or the like. By means of the tool, for example, the cable pull can be grasped and securely manually and mechanically actuated, in order to deactivate the parking lock via the cable pull. If a gear ratio of the actuator is used for this purpose, for example, to deactivate the parking lock via the gear ratio, thus, for example, forces of only up to 120 N are sufficient to deactivate the parking lock. As a result, the parking lock can be actuated easily and conveniently from the interior. In particular, the following advantages may be implemented by means of the actuating device according to the invention:

High design compatibility in the region of the center console, since the through opening forms an access, for example, laterally on the center console. In this way, the freedom of design on the center console is preserved, because access via storage compartments or beverage holders above the actuator is not required.

Simple operability and ergonomically favorable positioning of the actuating device and thus of the emergency release of the transmission Minimal cost expenditure in the center console for the accessibility of the actuating device and thus the emergency release Tool for actuating the emergency release can be housed easily in the vehicle toolkit Minimal time and cost expenditure for maintenance cases The access (through opening) is, for example, implemented and/or covered laterally on the center console by a small lid. This lid can be adapted specifically to the brand of the center console as a cap component and is located very unobtrusively outside the direct field of view of the driver. The access or the closure cap, respectively, or the through opening can also be positioned from the driver or front passenger side.

The unlocking position is targeted and independently held within or with the aid of the vehicle toolkit and does not have to be fixed using a separate pin tool and/or manual fixing. The release takes place by simply removing the tool.

The release position is clearly apparent on the inserted tool of the vehicle toolkit laterally to the center console.

The release tool and also the design of the emergency release on the actuator can be designed across brands and thus cost-effectively uniform.

The recognition feature of the emergency release actuator is identical across brands.

The required actuating force of the release is easily generated and overcome by means of the gear ratio of the actuating mechanism.

In addition, the following requirements can be met in the actuating device according to the invention:

accessibility for simple tool (in the cases with integrated gear ratio)

design for actuator, for lateral insertion of the tool in particular design of the center console having, for example, lateral hole and small lid for the tool minimal interior design influence operability and ergonomics preserve further variants of the positioning option of the actuator checking of the possible uses, in particular for sports cars, sedans, and off-road vehicles consideration of all influences and premises for extensive use It has furthermore been shown to be particularly advantageous if the tool is formed as a vehicle-fixed tool, which is held at least indirectly, in particular directly, on the center console and is in particular movable in relation to the center console, in particular pivotable. In this case, for example, the tool penetrates the through opening, in particular to actuate the actuating element, in at least one position in which the tool is movable in relation to the center console. In this way, a clear and defined positioning of the tool is implemented, so that the tool can be found rapidly and easily and conveniently and can be used or actuated to deactivate the parking lock.

The tool is, for example, a push rod, which can be translationally moved, in particular in relation to the center console, and at the same time in particular firstly toward the roller. In particular, it is conceivable that the tool or the push rod comprises at least one first formfitting element, wherein the roller comprises, for example, at least one second formfitting element corresponding with the first formfitting element. In order, for example, to move the tool into in particular formfitting interaction with the roller, the formfitting element is brought into formfitting interaction, for example, in that the formfitting elements are inserted one into another. For this purpose, the tool or the push rod is moved translationally, in particular in relation to the center console and/or in relation to the roller, and in particular is moved toward the roller. The tool or the push rod functions in this case, for example, as a key, which is at least partially inserted into the second formfitting element, which is formed, for example, as a corresponding opening. The tool thus interacts in a formfitting manner with the roller, so that when the tool is thereupon rotated around the axis of rotation, the roller is also rotated around the axis of rotation with the tool. In this way, the parking lock can be deactivated particularly easily.

In order to deactivate the parking lock in a particularly easy and convenient manner, it is provided in an advantageous design of the invention that the axis of rotation in the installation location of the actuating device extends in a plane spanned by the vehicle transverse direction and the vehicle longitudinal direction. The roller thus stands upright, for example, in the vehicle vertical direction and is thus, for example, a vertical roller, by which a particularly advantageous gear ratio can be provided.

In order to be able to actuate or rotate the roller particularly easily and, for example, from a driver or front passenger seat in this case, it is provided in a further design of the invention that the axis of rotation extends in the vehicle transverse direction in the installation location of the actuating device.

To keep the installation space requirement of the actuating device particularly small, in particular in the vehicle vertical direction, it is provided in a further design of the invention that the axis of rotation extends in the vehicle vertical direction in the installation location of the actuating device. The roller is designed in this case, for example, as a recumbent roller, which can in particular be actuated in an easy manner favorable for installation space in that a rotation of the roller around the axis of rotation can be effectuated or is effectuated by translational movement of the tool, in particular in relation to the center console.

A further embodiment is distinguished in that the actuating device comprises a pawl, which is movable between at least one blocking position and at least one release position. In the blocking position, the roller is secured by means of the pawl against a rotation around the axis of rotation in at least one or precisely one rotational direction. In the release position, however, the pawl releases the roller for a rotation around the axis of rotation at least in the at least one rotational direction. The pawl is in this case, for example, pivotable between the blocking position and the release position, in particular in relation to the roller and/or in relation to the center console.

By means of the pawl, it is thus possible to prevent a rotation of the roller around the axis of rotation in the at least one rotational direction, so that, for example, an undesired reset of the actuating element and thus the parking lock and thus an undesired and in particular automatic or independent activation of the initially deactivated parking lock can be avoided. In other words, it is firstly possible by means of the actuating device according to the invention to mechanically deactivate the parking lock by means of the roller in a particularly simple manner, in particular, for example, in that the roller is rotated in a second rotational direction, opposite to the at least one rotational direction, around the axis of rotation, in particular in relation to the center console. The parking lock is in particular deactivated against gravity and/or against a spring force, so that the gravity and/or the spring force opposes the deactivation of the parking lock and thus the rotation of the roller in the second rotational direction. If, for example, the roller were now not secured against a rotation in the at least one rotational direction, the gravity and/or the spring force could thus effectuate a rotation of the roller in the at least one rotational direction, so that the parking lock would be activated again. This can be avoided, for example, in that a person fixes the tool and fixes the roller via the tool and thus secures it against a rotation in the at least one rotational direction, whereby the person keeps the parking lock deactivated.

However, at least to keep low an effort to be applied by the person to the tool and via the tool onto the roller, which is required to secure the roller against a rotation in the at least one direction or to be able to avoid such an effort, the pawl is provided, by means of which the roller is mechanically secured or can be secured against a rotation in the at least one rotational direction. Therefore, for example, the person—after they have deactivated the parking lock—does not have to secure the roller themselves against a rotation in the at least one rotational direction, but rather can concentrate, for example, on other tasks such as actuating a steering wheel and/or a brake of the motor vehicle, which can be moved or rolled and thus maneuvered, for example, with deactivated parking lock.

The roller is held, for example, at least indirectly, in particular directly, rotatably on the center console. Furthermore, it is conceivable that the roller is held, for example, at least indirectly, in particular directly, on the actuator. The roller is thus, for example, part of the actuator and/or is held thereon and can be installed and removed with it.

The pawl is held, for example, at least indirectly, in particular directly, pivotably and/or movably on the center console. Furthermore, it is conceivable that the pawl is held at least indirectly, in particular directly, movably and/or pivotably on the actuator.

To be able to deactivate the parking lock in a particularly easy and convenient manner, it is provided in one particularly advantageous embodiment of the invention that the pawl permits, in the blocking position, a rotation of the roller around the axis of rotation in the second rotational direction opposing the at least one rotational direction. It is thus possible, for example, that a person rotates the roller by means of the tool in multiple successive steps in the second rotational direction, wherein the person does not have to secure the roller against a rotation in the at least one direction between each two of the steps in immediate succession, since this takes place by means of the pawl. The pawl thus functions as a freewheel, which does permit a rotation of the roller in the second rotational direction, but prevents a rotation of the roller in the at least one rotational direction, while or if the pawl is located in its blocking position. In particular, it is conceivable that the pawl, in the release position, permits both a rotation of the roller around the axis of rotation in the at least one rotational direction, and also a rotation of the roller in the second rotational direction.

Finally, it has been shown to be particularly advantageous if the tool comprises at least one actuating region, by means of which the pawl is movable out of the release position into the blocking position. The movement of the pawl from the release position into the blocking position is effectuated by means of the tool via its actuating region, in particular in that or in such a way that the tool is firstly moved translationally and at the same time, for example, is inserted through the passage opening. The tool comes into supporting contact with the pawl in this case, for example, via the actuating region. If the tool is moved further translationally, for example, the pawl is thus moved via the actuating region from the release position into the blocking position. In particular, the pawl is held, for example, by means of the tool in the blocking position as long as the tool interacts at least indirectly, in particular directly, via the actuating region with the pawl. If the tool is then pulled back out of the passage opening, for example, so that the actuating region is disengaged from the pawl, the pawl is thus moved from the blocking position into the release position and/or the pawl automatically or independently moves out of the blocking position back into the release position.

BRIEF DESCRIPTION OF THE DRAWINGS

Exemplary embodiments of the disclosure also include combinations of the described embodiments. Exemplary embodiments of the invention are described hereafter. In the figures:

FIG. 4d shows a detail of a schematic top view of the actuating device according to the first embodiment;

FIG. 4e shows a detail of a schematic rear view of the actuating device according to the first embodiment;

FIG. 4f shows a detail of a schematic side view of a tool of the actuating device according to the first embodiment;

DETAILED DESCRIPTION

The exemplary embodiments explained hereafter are preferred embodiments of the invention. In the exemplary embodiments, the described components of the embodiments each represent individual features of the invention to be considered independently of one another, which each also refine the invention independently of one another and are thus also to be considered to be part of the invention individually or in a combination other than that shown. Furthermore, the described embodiments can also be supplemented by further ones of the above-described features of the invention. In the figures, functionally identical elements are provided with the same reference signs.

Figure 1:
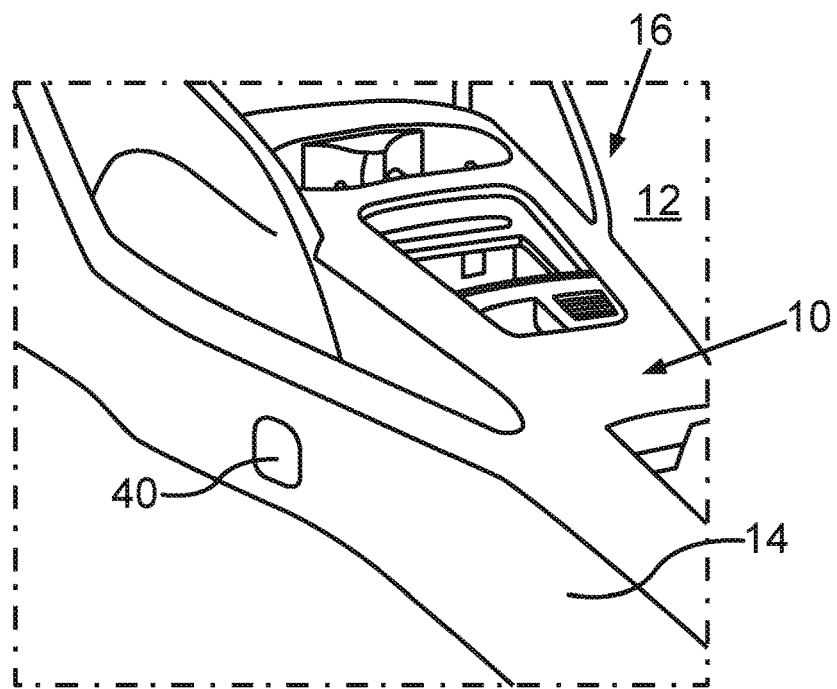
FIG. 1 shows a detail of a schematic perspective view of a center console of an actuating device for a motor vehicle.
Figure 4A:
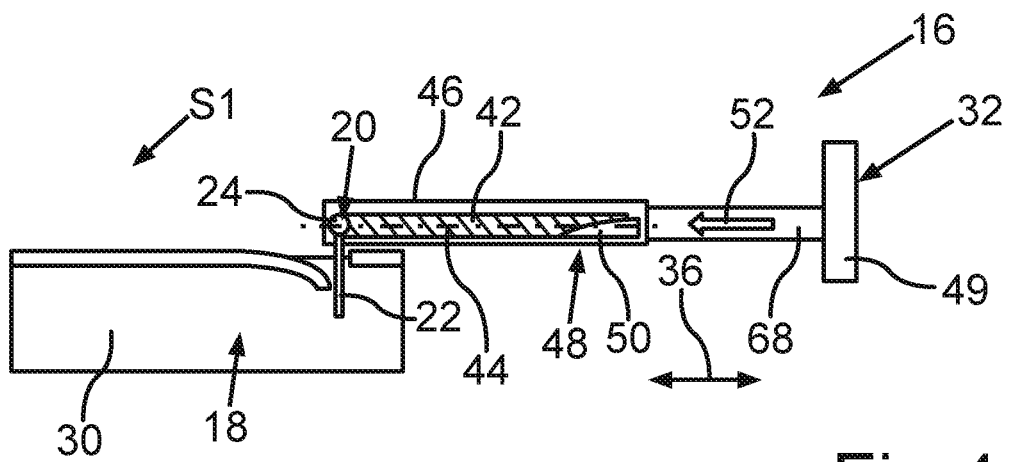
FIG. 4a shows a detail of a schematic and sectional side view of an actuating device according to the invention according to a first embodiment, which comprises, for example, the center console according to FIGS. 1 and 2.

FIG. 1 shows a detail, in a schematic perspective view, of a center console 10 of a motor vehicle preferably designed as a passenger vehicle, wherein the center console 10 is shown in its installed position in FIG. 1. The center console 10 occupies its installed position shown in FIG. 1 in this case in the completely produced state of the motor vehicle. In this completely produced state of the motor vehicle, the center console 10 is arranged in the interior 12 of the motor vehicle. The center console 10 comprises, for example, aside wall 14, by which, for example, a foot well of the driver or front passenger of the motor vehicle is at least partially, in particular at least predominantly or completely, delimited in the vehicle transverse direction, in particular toward a foot well of the front passenger or driver, respectively, of the motor vehicle. The center console 10 is part of an actuating device identified as a whole by 16, which is explained in greater detail hereafter. Here, for example, FIGS. 4a-o show a first embodiment of the actuating device 16, wherein the center console 10 is used or can be used in the first embodiment.

The actuating device 16 is used to be able to mechanically and manually deactivate an emergency release of a transmission and, via this, a parking lock of a transmission of the motor vehicle and thus release it. The motor vehicle comprises in its completely produced state the transmission and at least one drive engine, wherein, for example, the motor vehicle or at least one wheel of the motor vehicle, respectively, can be driven by the drive engine via the transmission. The transmission comprises for this purpose at least one transmission housing and one transmission output shaft, which is coupled, for example, to the at least one wheel. The transmission output shaft is at least partially accommodated in the housing and can in principle rotate around an axis of rotation in relation to the housing. The parking lock mentioned can be activated or engaged and deactivated or disengaged. If the parking lock is engaged, the transmission output shaft is thus secured against a rotation around the axis of rotation in relation to the housing, so that the transmission output shaft and thus the wheel cannot rotate around the axis of rotation in relation to the housing. Undesired rolling away of the motor vehicle is thus avoided, in particular if the motor vehicle is stopped and/or parked on a slope. If the parking lock is deactivated or disengaged, the parking lock thus releases the transmission output shaft for a rotation around its axis of rotation in relation to the housing. The transmission is therefore mechanically locked when the parking lock is activated.

Figure 3:
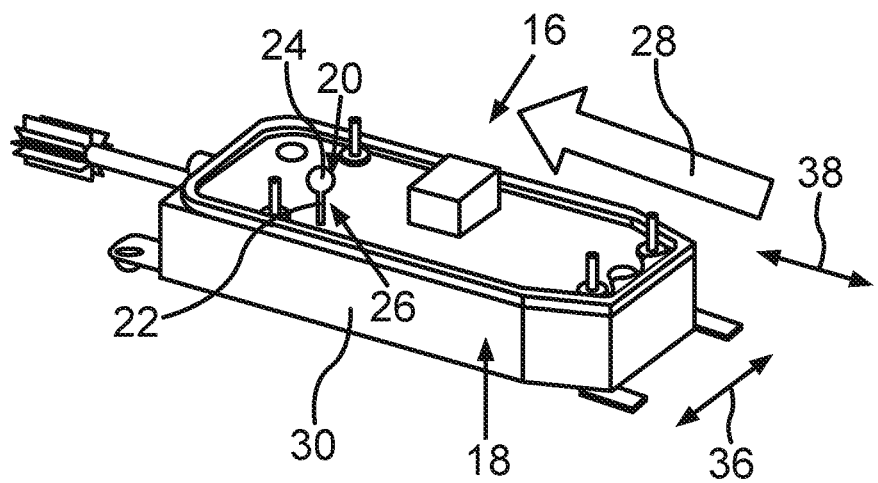
FIG. 3 shows a schematic perspective view of an actuator for actuating a parking lock of the transmission.

FIG. 3 shows an actuator 18 which is, for example, an electrically operable actuator and comprises for this purpose, for example, at least one electric motor. By means of the actuator 18, the parking lock can be electrically at least deactivated or disengaged. For this purpose, the actuator 18 is supplied with electric current. In this manner, it is possible to deactivate the parking lock, for example, in that a person located in the interior 12 actuates an operating element arranged in the interior 12 to deactivate the parking lock, without a direct mechanical connection being provided between the operating element and the parking lock for this purpose. If the person actuates the operating element, an electrical signal characterizing the actuation of the operating element is thus detected in the functional state of the motor vehicle. As a result of the detection of the signal, the actuator 18 is actuated, in order to deactivate the parking block by means of the actuator 18 by way of the activation of the actuator 18. Since the parking lock can thus be deactivated without a mechanical connection existing between the operating element and the parking lock, a shift-by-wire actuation of the parking lock is thus provided.

If the parking lock is initially activated and a power failure occurs and thus a malfunction of the motor vehicle, so that as a result of the actuation of the operating element, neither the mentioned electrical signal can occur nor can the actuator 18 be electrically operated, the emergency release of the transmission and, via this, the parking lock can be mechanically actuated manually by a person located in the interior 12 by means of the actuating device 16, whereby the parking lock is manually and mechanically deactivated. The emergency release of the transmission is in this case, for example, part of the actuator 18.

For this purpose, the actuating device 16 comprises, for example, at least one vehicle-fixed actuating element 20, particularly apparent from FIG. 3, by means of which or via which the parking lock can be manually and mechanically deactivated. In the exemplary embodiment illustrated in FIG. 3, the actuating element 20 comprises, for example, a traction means in the form of a cable pull 22, which is also referred to as a Bowden cable. In addition, the actuating element 20 comprises, for example, a fitting 24 also referred to as a head, which is arranged at one end 26 of the cable pull 22 and is connected to the cable pull 22. To deactivate the parking lock, a force formed in particular as a traction force is exerted on the actuating element 20. The traction force is at least indirectly transmitted to the parking lock via the actuating element 20, whereby the parking lock is mechanically and manually deactivated. To transmit the force to the actuating element 20 and as a result to the parking lock, the actuating element 20 is pulled upon. Furthermore, an arrow 28 illustrates the forward travel direction of the motor vehicle in FIG. 3.

In particular, the actuating element 20 is coupled to the parking lock via an actuating mechanism of the actuator 18, which is not visible in FIG. 3 and is accommodated, for example, in a housing 30 of the actuator 18, so that the parking lock can be mechanically and manually deactivated, i.e., disengaged, by means of the actuating element 20 via the actuating mechanism. The actuating mechanism is, for example, a gearing and/or has a gear ratio different from 1. In this way, for example, forces or torques exerted manually by the person on the actuating element 20 can be converted into higher forces or torques in relation thereto, which act on the parking lock. The parking lock can thus be deactivated even using only minor forces or torques exerted manually by the person on the actuating element 20, so that the parking lock can be disengaged easily and conveniently.

Figure 4B:
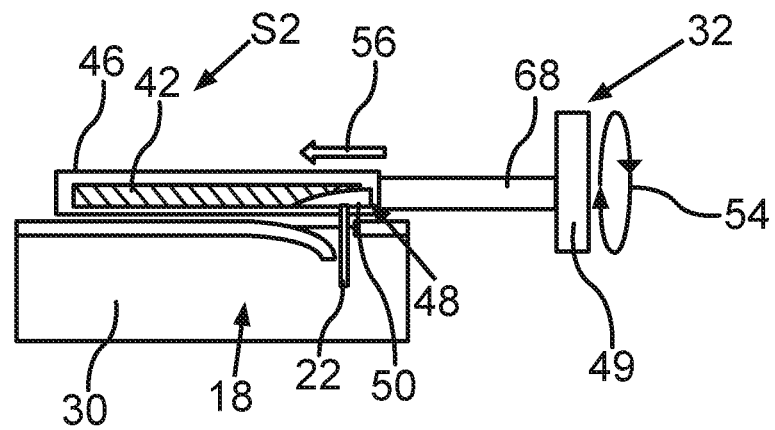
FIG. 4b shows a detail of a schematic and sectional side view of an actuating device according to the invention according to a first embodiment, which comprises, for example, the center console according to FIGS. 1 and 2.
Figure 4C:
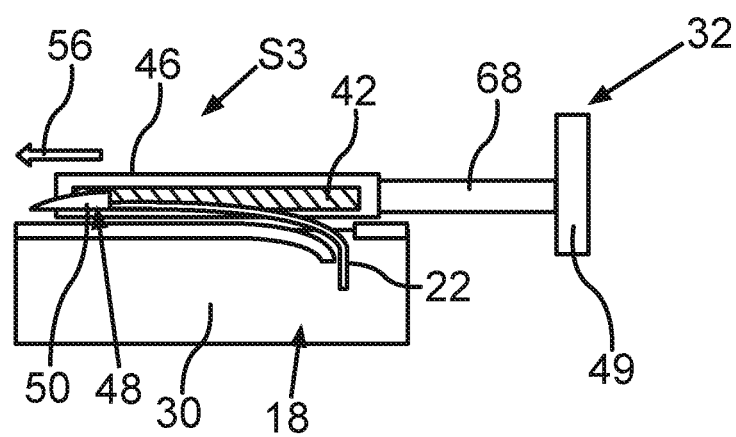
FIG. 4c shows a detail of a schematic and sectional side view of an actuating device according to the invention according to a first embodiment, which comprises, for example, the center console according to FIGS. 1 and 2.
Figure 4G:
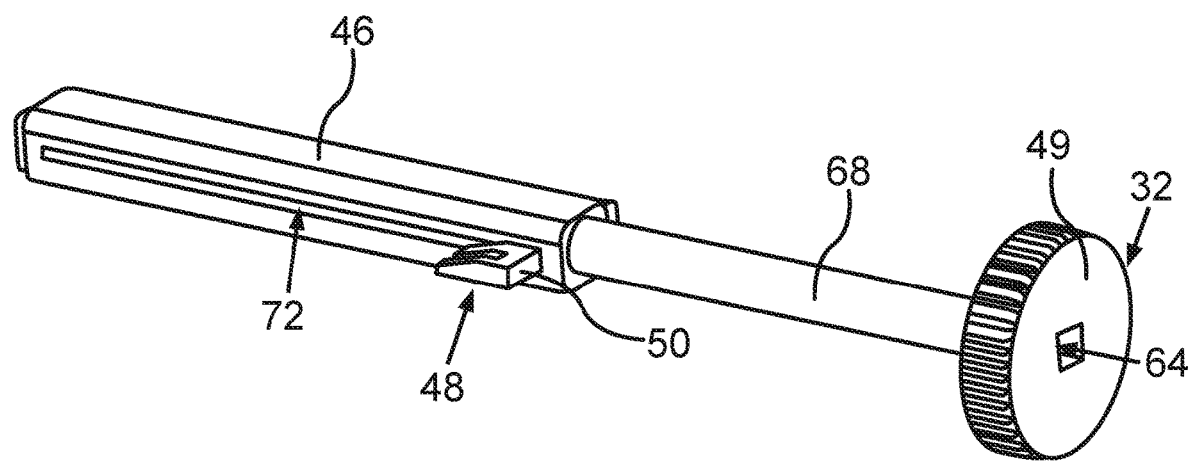
FIG. 4g shows a schematic perspective view of the tool according to FIG. 4f.

The actuating device 16 additionally comprises a tool 32, particularly apparent in FIGS. 4a-c and formed separately from the actuating element 20, via which the actuating element 20 is mechanically and mechanically actuatable to manually deactivate the parking lock. In other words, the person can handle the tool 32 and manually and mechanically actuate the actuating element 20 via the tool 32, to thus manually and mechanically deactivate the parking lock. In this way, the parking lock can be deactivated even in the event of a power failure. The feature that the tool 32 is formed separately from the actuating element 20 is in particular to be understood to mean that the actuating element 20 and the tool 32 are formed as at least two components formed separately from one another, which can interact to thus actuate the actuating element 20 by means of the tool 32.

Figure 2:
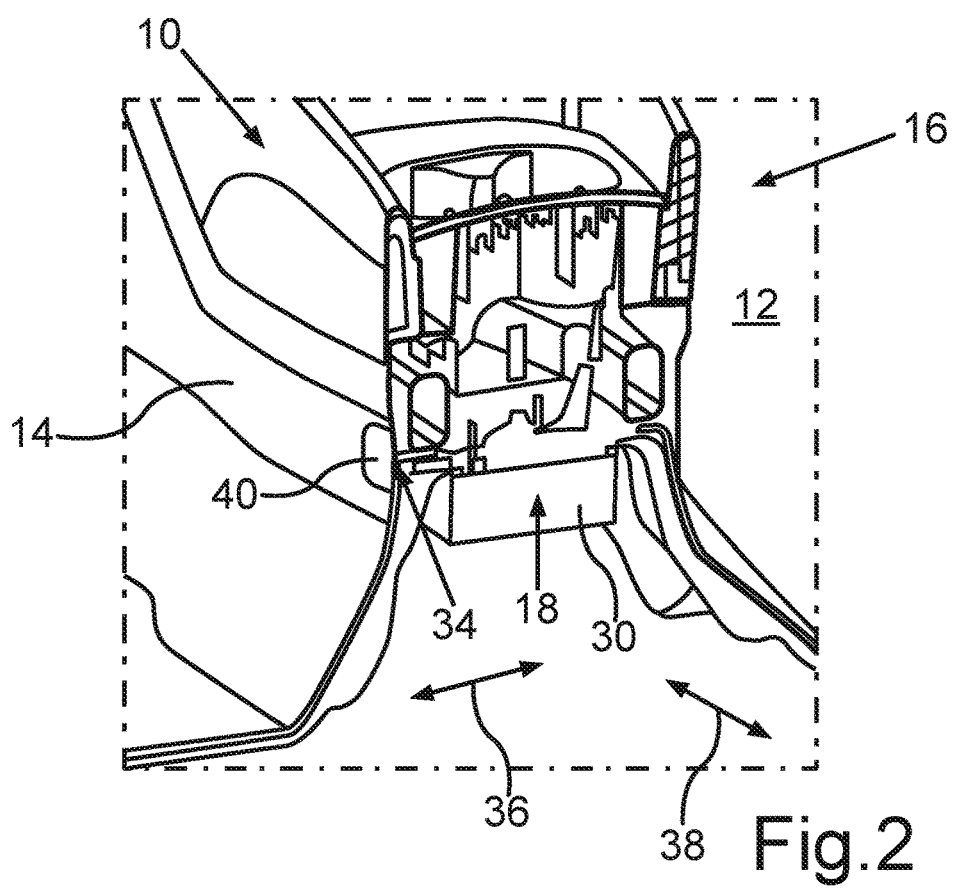
FIG. 2 shows a detail of a schematic and perspective sectional view of the center console.

In order to now be able to deactivate the emergency release of the transmission and, via this, the parking lock in a particularly simple and comfortable manner, in particular manually and mechanically, the actuating device 16 comprises—as is particularly apparent from FIGS. 1 and 2—at least one through opening 34, which is formed in the center console 10, which can be arranged or is arranged in the interior 12 of the motor vehicle, and is formed here in the side wall 14 and has a passage direction illustrated in FIG. 2 by a double arrow 36. The passage direction extends in this case in an imaginary plane spanned by the vehicle transverse direction and the vehicle longitudinal direction, wherein the vehicle longitudinal direction is illustrated by a double arrow 38 in FIG. 2 and coincides with the forward travel direction illustrated by the arrow 28 in FIG. 3. In the first embodiment and/or in the exemplary embodiment illustrated in FIGS. 1 and 2, the passage direction of the through opening 34 extends along the vehicle transverse direction or the passage direction coincides with the vehicle transverse direction, so that in FIG. 2, the vehicle transverse direction is illustrated by the double arrow 36. The through opening 34 can be penetrated by the tool 32 along the passage direction, to thus bring the tool 32 into interaction with the actuating element 20, to thereby mechanically and manually actuate the actuating element 20, and thus mechanically and manually deactivate the parking lock.

In the first embodiment, the tool 32 is formed as a tool separate from the center console 10, which is pushed through the through opening 34 into or along the passage direction, to thus bring the tool 32 into interaction with the actuating element 20. It is particularly apparent from FIGS. 1 and 2 that the through opening 34 is associated with a cover element 40 formed as a lid, for example, by means of which the through opening 34 is closed or closable. In particular, the cover element is reversibly held detachably on the center console 10. To move the tool 32 in the passage direction in relation to the center console 10 and insert it through the through opening 34 at the same time, the cover element 40 is removed out of or from the through opening 34, whereby the through opening 34 is exposed.

It is apparent from FIG. 1 that, for example, in the exemplary embodiment illustrated in FIG. 1, an access to the actuating element 20 via the through opening is provided from left to right in the vehicle transverse direction. Alternatively, the access can take place from the right or via a removable component or panel. The through opening 24 could be left entirely open. A holder referred to as a multifunction holder can also be used as the cover element 44, for example, on which, for example, objects can be held and/or suspended.

In the first embodiment, the tool 32 comprises a threaded spindle 42, which is rotatable, for example, around an axis of rotation 44 in relation to a housing 46 of the tool 32. In this case, the tool 32 comprises the housing 46, in which the threaded spindle 42 is at least partially, in particular at least predominantly or completely, accommodated. The tool 32 furthermore comprises, for example, an operating part 49 formed as a rotary knob, via which, for example, the threaded spindle 42 can be rotated around the axis of rotation 44 in relation to the housing 46. The tool 32 furthermore comprises a movement element 48, which is translationally movable, i.e., displaceable, by a relative rotation between the threaded spindle 42 and the movement element 48 along the threaded spindle 42 and at the same time along the axis of rotation 44 in relation to the center console 10 and in relation to the housing 46, to thus actuate the actuating element 20. The movement element 48 comprises, for example, a nut (not visible in the figure), which is screwed onto the threaded spindle 42. Moreover, the movement element 48 comprises, for example, a slide 50. The movement element 48 is secured, for example, against a rotation around the axis of rotation 44 in relation to the housing 46. If the threaded spindle 42 is rotated around the axis of rotation 44 in relation to the housing 46, in particular via the rotary knob, the movement element 48 thus does not also rotate at the same time around the axis of rotation 44 in relation to the housing 46. The threaded spindle 42 comprises an external thread, wherein the movement element 48, in particular the nut, comprises an internal thread corresponding to the external thread. The threaded spindle 42 and the nut are screwed together in this case via the external thread and the internal thread. In other words, the nut is, for example, screwed via its internal thread onto the threaded spindle 42 via the external thread. The external thread and the internal thread are also referred to as threads. By means of the thread, the described relative rotation between the threaded spindle 42 and the movement element 48, in particular the nut, is converted into a translational movement of the movement element 48 along the axis of rotation 44 in relation to the housing 46.

In a first step S1 apparent from FIG. 4a, for example, the tool 32 is inserted along the passage direction through the through opening 34. In this case, for example, the actuating element 20, in particular the fitting 24, is inserted into the housing 46 and brought into interaction, in particular formfitting interaction, with the movement element 48, in particular with the slide 50. For this purpose, the slide 50 comprises a recess, for example, in which the fitting 24 comes to rest. This insertion of the tool 32 into or through the through opening 34 is illustrated in FIG. 4a by an arrow 52. Thereupon—as illustrated in FIG. 4b by an arrow 54—in a second step S2 illustrated in FIG. 4b, the threaded spindle 42 is rotated around the axis of rotation 44 in relation to the housing 46 and in relation to the movement element 48. The movement element 48—as illustrated by an arrow 56 in FIG. 4b—is thus moved along the axis of rotation 44 in relation to the housing 46.

Since the slide 50 interacts in a formfitting manner with the fitting 24 and thus with the actuating element 20 in this case, in a third step S3 illustrated in FIG. 4c, a force formed in particular as a traction force is exerted on the actuating element 20 by the described movement of the movement element 48. In the first embodiment, the cable 22 is pulled via the fitting 24, whereby the parking lock is deactivated or released. This is illustrated in FIG. 4c. Overall, it is apparent from FIGS. 4a-c that the tool 32 penetrates the through opening 34 in the vehicle transverse direction or along the through direction in a state in which the parking lock is released by means of the tool 32.

The fitting 24 is, for example, a flex shaft, which is captured and finally pulled in the described manner by, for example, a slide 50 formed as a catch hook. In the described manner, for example, the actuating element 20 is moved into a release position, in which the parking lock is deactivated. The threaded spindle 42 preferably comprises self-inhibition, so that the movement element 48 and the actuating element 20 are held by the self-inhibition in the release position. In this way, the parking lock is held deactivated by the self-inhibition of the threaded spindle 42.

The parking lock is in particular released or deactivated in that the threaded spindle 42 is rotated in a first rotational direction around the axis of rotation 44 in relation to the housing 46. In order to lock or activate the parking lock again, the threaded spindle 42 is rotated, for example, via the operating part 49 in a second rotational direction opposite to the first rotational direction around the axis of rotation 44 in relation to the housing 46. In this way, the movement element 48 is displaced back from the release position, whereby the actuating element 20 can also retract. As a result, the parking lock is reactivated. Alternatively or additionally, it is conceivable to activate the parking lock in such a way that the tool 32 is simply pulled back out of the through opening 34.

It is particularly apparent from FIG. 4d that the slide 50 can be formed as a catch hook. The slide 50 comprises, for example, the mentioned recess identified by 58 in FIG. 4d, which is open in particular along the passage direction. In this way, the actuating element 20 can be moved into the recess 58, in that the tool 32 is moved along the passage direction in relation to the actuating element 20.

It is particularly apparent from FIG. 4e that the tool 32 comprises a first guide element 60. The guide element 60 is provided, for example, on the housing 46 and has, for example, an at least substantially T-shaped cross section. A second guide element 62 is provided on the actuator 18, into which the guide element 60 can be inserted along the passage direction. The guide elements 60 and 62 can interact in a formfitting manner, whereby the tool 32 is guided in a defined manner upon insertion into or through the through opening 34.

The operating part 49 formed as a rotary knob, which can be actuated particularly easily by hand and can thus be rotated in relation to the housing 46 around the axis of rotation 44, is particularly apparent from FIG. 4f. It is particularly apparent from FIG. 4g that the operating part 49 comprises a tool engagement point 64 formed, for example, as a quadrilateral socket, in particular as a polygon socket, via which the operating part 49 and thus the threaded spindle 42 can interact in a formfitting manner with a rotating or screwing tool, for example, a drill. By means of the rotating tool, torques can be exerted in a formfitting manner on the operating part 49 and thus on the threaded spindle 42 in order, for example, to rotate the threaded spindle 42 by means of the rotating tool around the axis of rotation 44 in relation to the housing 46. The parking lock can thus be released particularly quickly and easily.

Figure 4H:
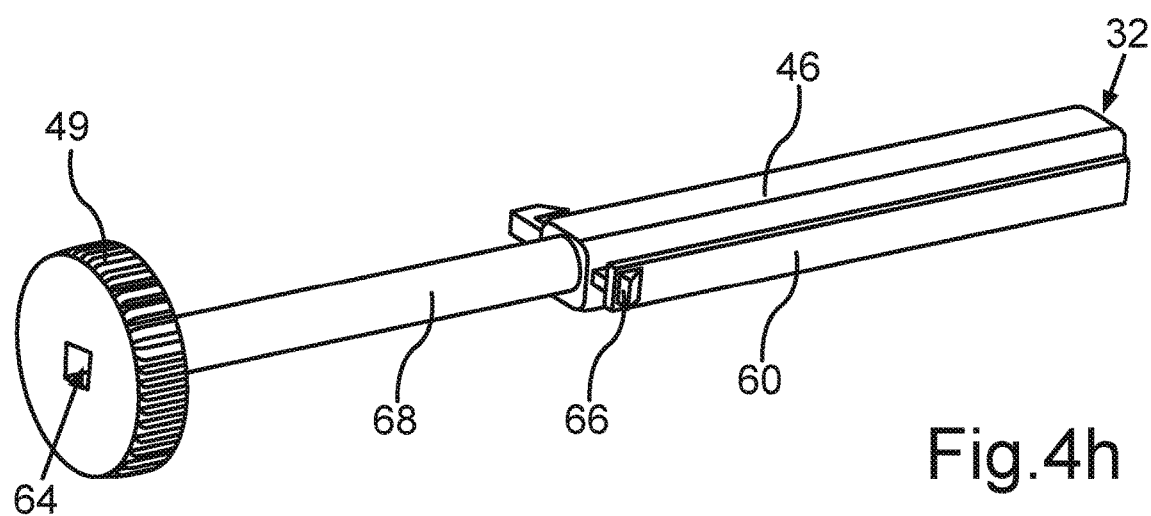
FIG. 4h shows a schematic perspective view of the tool according to FIG. 4f.

Furthermore, it is particularly apparent from FIG. 4h that the guide element 60 is formed as a T-rail for the guide on the actuator 18. An angle part is provided as an end stop 66 in this case. The tool 32 can thus be translationally moved along the passage direction and along the guide element 62 in relation to the center console 10 until the end stop 66 comes into support contact with the guide element 62 along the passage direction. The tool 32 is then located in an advantageous position, in which the movement element 48 can be translationally moved in the described manner in relation to the housing 46 to actuate the actuating element 20 and as a result to deactivate the parking lock.

Figure 4I:
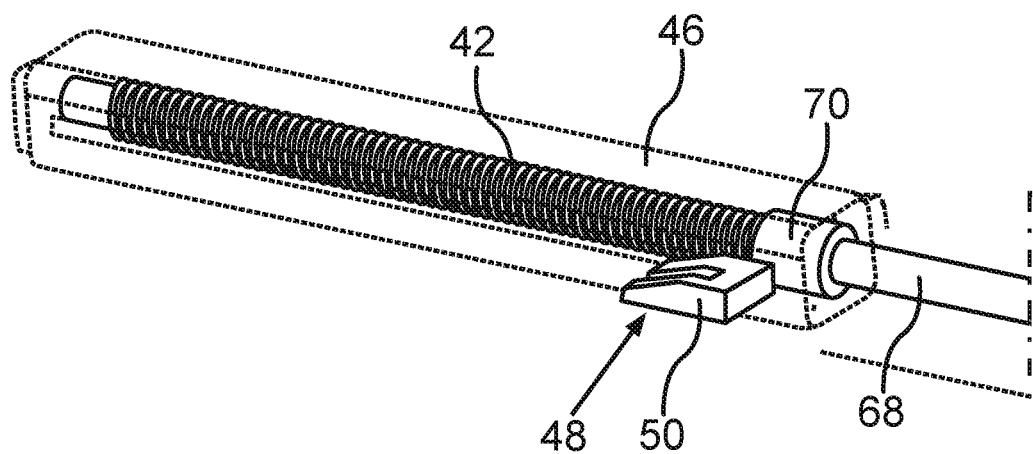
FIG. 4i shows a detail of a schematic perspective view of the tool according to FIGS. 4f-h.

It is particularly apparent from FIG. 4i that the operating part 49 is connected in a rotationally-fixed manner to an actuating rod 68, which is in turn connected in a rotationally-fixed manner to the threaded spindle 42. In particular, for example, the actuating rod 68 is integrally formed with the threaded spindle 42. In FIG. 4i, the housing 46 is shown transparent so that the nut identified by 70 in FIG. 4i, which is screwed onto the threaded spindle 42, is particularly apparent in FIG. 4i. In addition, it is particularly apparent from FIG. 4i that the nut 70 is connected to the slide 50 formed as a catch hook.

It is particularly apparent from FIG. 4g that the movement element 48 penetrates, for example, a slot 72 of the housing 46 and can be moved translationally in relation to the housing 46 along the slot 72.

Figure 4J:
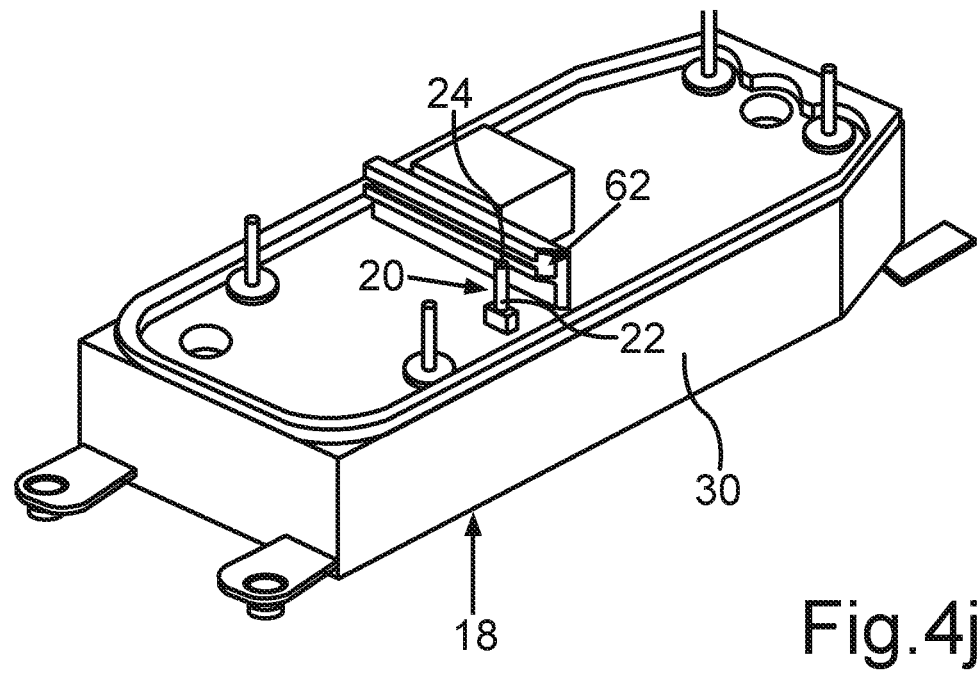
FIG. 4j shows a schematic perspective view of the actuator for the first embodiment of the actuating device.
Figure 4K:
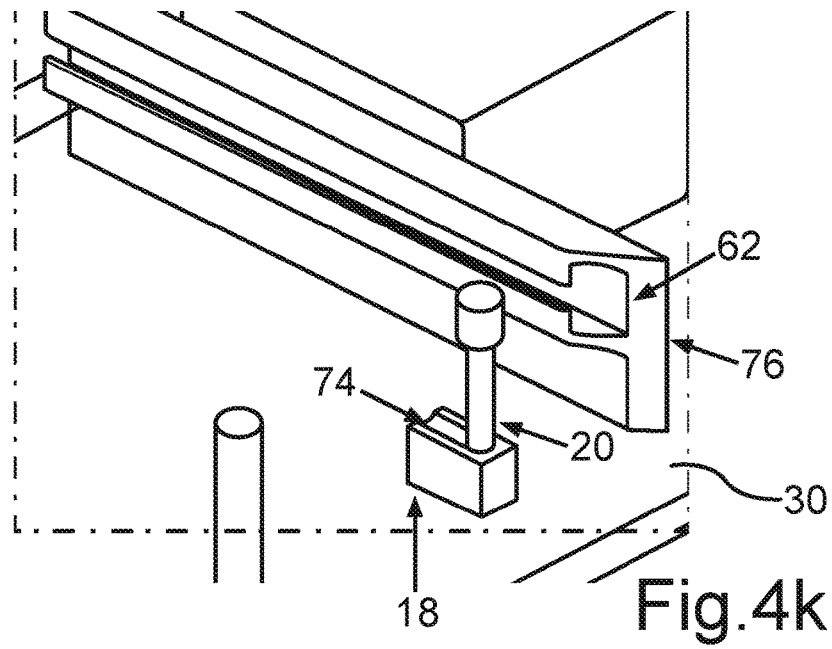
FIG. 4k shows a detail of a schematic perspective view of the actuator according to FIG. 4j.
Figure 4L:
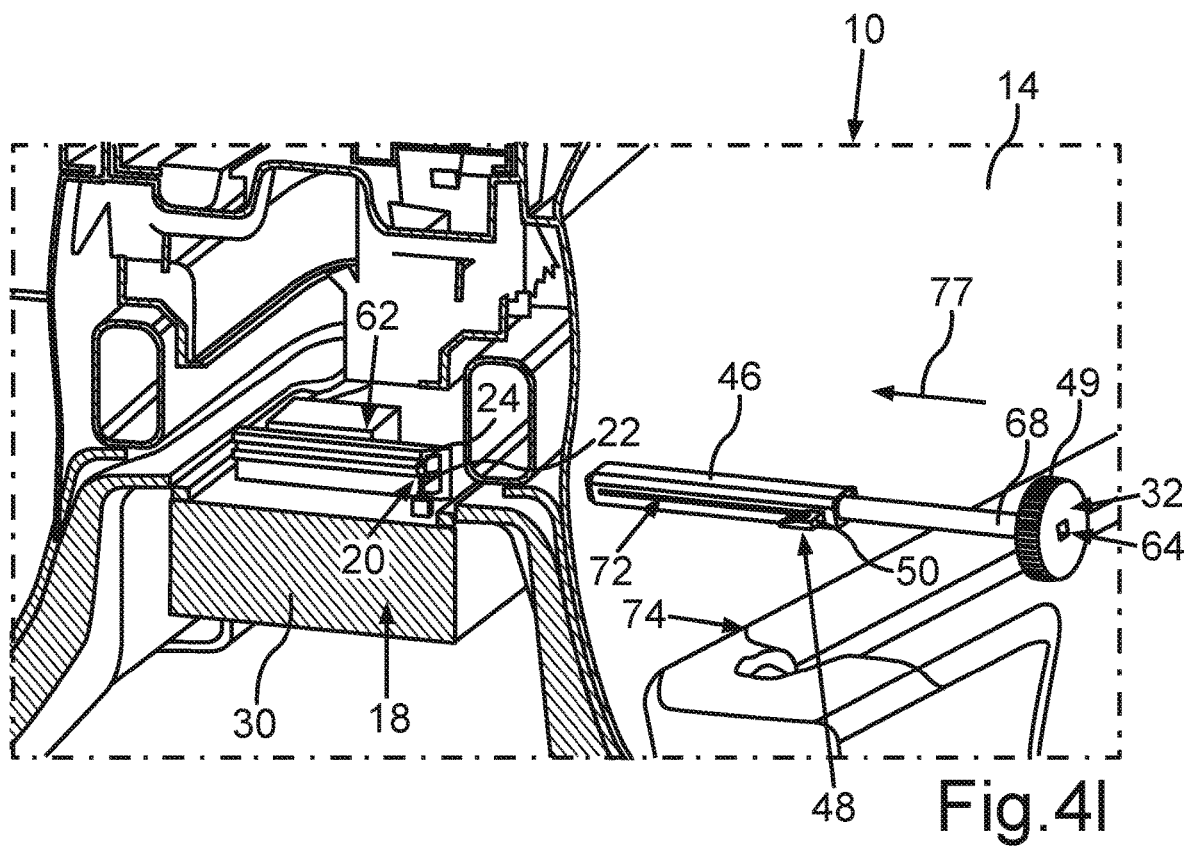
FIG. 4l shows a detail of a schematic and perspective sectional view of the actuating device according to the first embodiment.

FIG. 4j shows the actuator 18 which is used for the first embodiment. The actuating element 20 and the guide element 62 are particularly apparent from FIGS. 4j and 4k. The guide element 62 is formed as a T-part corresponding to the T-rail for guiding the tool 32. In this case, a guide part 74 is provided, by means of which the actuating element 20 is guided into the release position during its movement. On its frontal end face 76, the guide element 62 comprises a bevel or the guide element 62 is formed inclined, to be able to thread the T-rail particularly easily into the guide element 62.

Figure 4M:
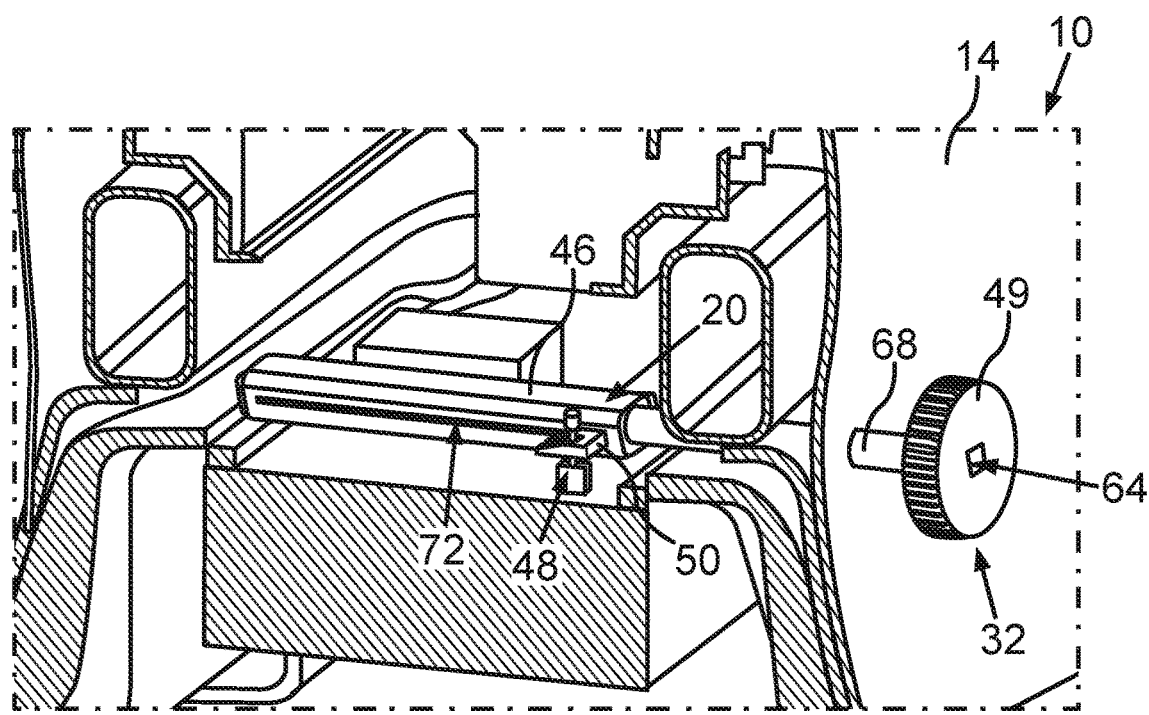
FIG. 4m shows a schematic perspective view of the tool according to FIG. 4f.
Figure 4N:
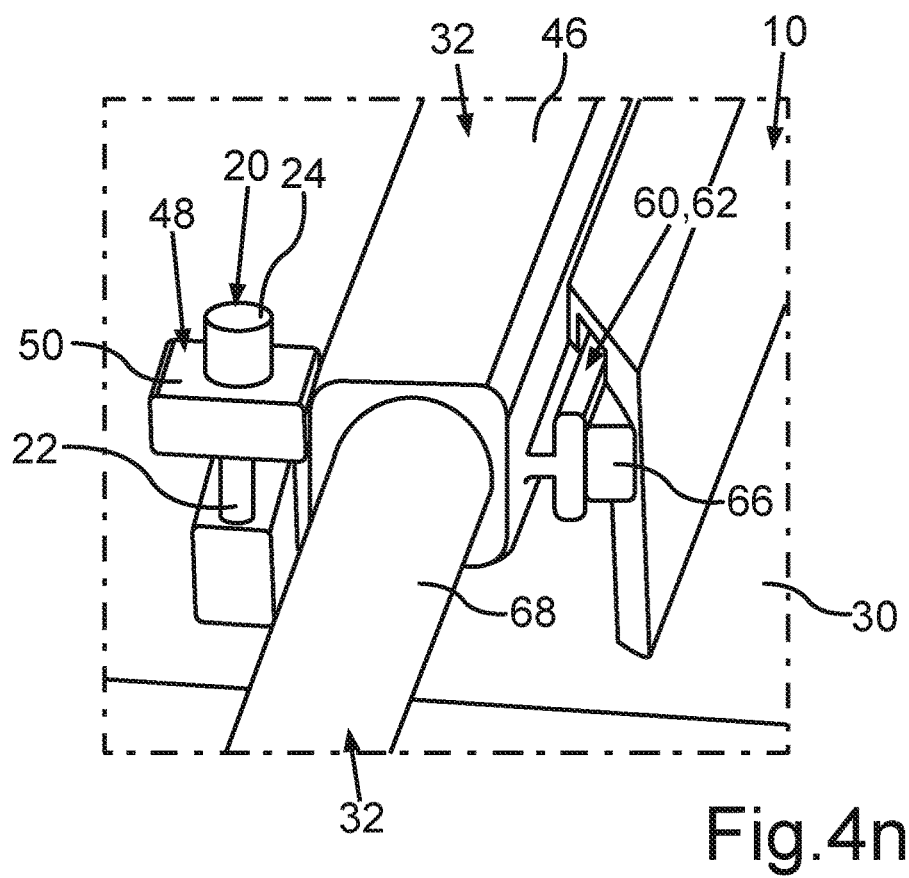
FIG. 4n shows a detail of a schematic perspective view of the actuating device according to the first embodiment.
Figure 4O:
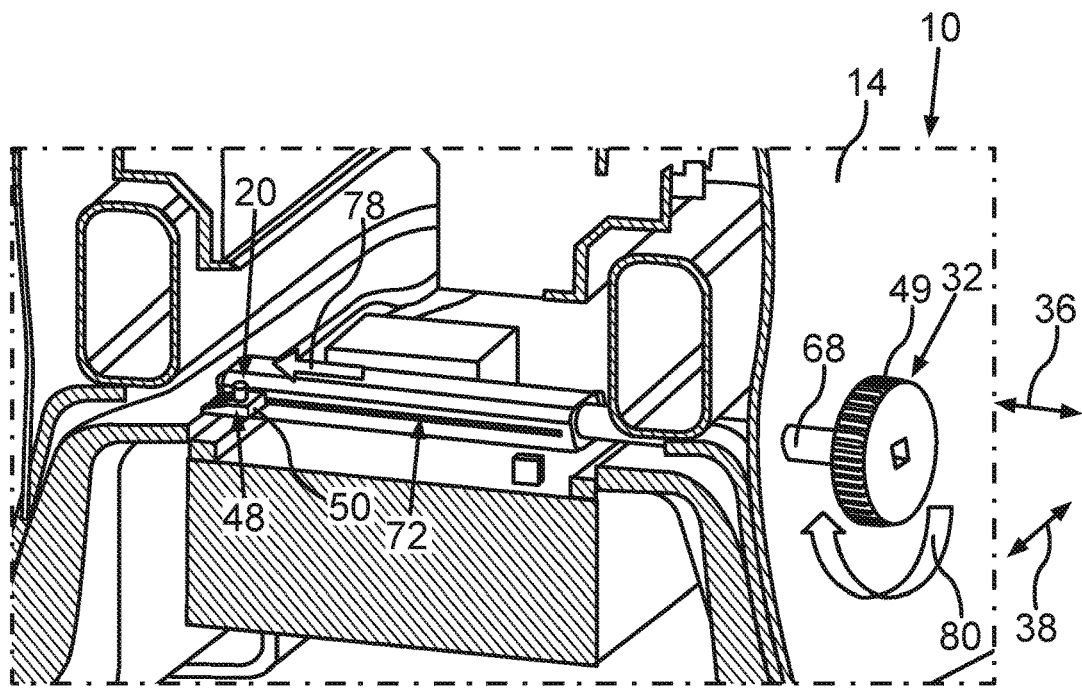
FIG. 4o shows a detail of a schematic and sectional perspective view of the actuating device according to the first embodiment.

As illustrated in FIG. 4i by an arrow 77, the tool 32 is firstly inserted through the through opening 34 and thus through the side wall 14. In this case—as is particularly apparent from FIGS. 4m and 4n—the guide element 60 is brought into formfitting interaction with the guide element 62, whereby the tool 32 is guided in a defined manner in relation to the center console 10. The tool 32 is inserted through the through opening 34 until the end stop 66 comes into supporting contact with the guide element 62 along the passage direction. The guide element 20 is then located in the catch hook, in particular in the recess 58 of the movement element 48. If the threaded spindle 42 is then rotated in the first rotational direction in relation to the housing 46, the actuating element 20 is thus moved into the release position—as is apparent from FIG. 4o—whereby the parking lock is deactivated. This is illustrated in FIG. 4o by an arrow 78, wherein an arrow 80 illustrates the rotation of the threaded spindle 42 and thus of the rotary knob in the first rotational direction.

FIGS. 5a-d illustrate a second embodiment of the actuating device 16. In the second embodiment, the tool 32 is designed as a push rod, which is integral in particular, and which can be pushed through the through opening 34 along the passage direction. The push rod in this case comprises a formfitting device 82, which can be brought into formfitting interaction with the actuating element 20 to actuate the actuating element 20. In the second embodiment, the formfitting device 82 comprises external gear teeth 84, which comprise a plurality of teeth 86 arranged in succession along the passage direction.

Figure 5A:
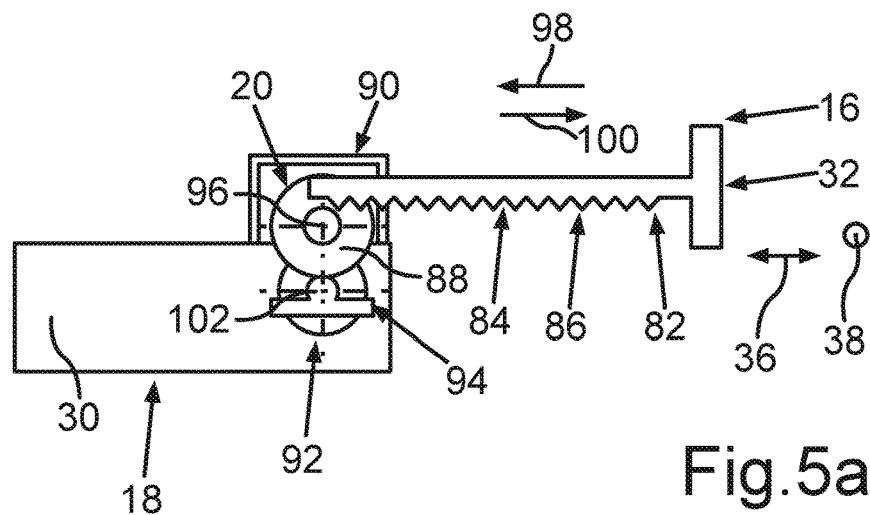
FIG. 5a shows a detail of a schematic sectional view of the actuating device according to a second embodiment.

In the second embodiment, the actuating element 20 is, for example, a gearwheel 88, having further external gear teeth, which can interact with the external gear teeth 84. The gearwheel 88 is, for example, part of a release attachment 90 and can be part of a gearing also referred to as a release gearing. It can be seen from FIG. 5a that the actuator 18 can actuate, for example, the above-mentioned electric motor identified by 92 in FIG. 5a and comprises a gearing 94, which can be actuated via the gearwheel 88. The gearwheel 88 is rotatable around an axis of rotation 96 in relation to the housing 30 of the actuator 18. If the push rod is now displaced along the passage direction in relation to the housing 30 and in relation to the center console 10, so that the external gear teeth 84 interact with the external gear teeth of the gearwheel 88, the gearwheel 88 is thus rotated around the axis of rotation 96 in relation to the housing 30. As a result, the transmission 94 and the electric motor 92 of the actuator 18 are rotated, whereby the parking lock is deactivated via the actuator 18, in particular the gearing 94, by means of the push rod. In other words, by pushing the push rod designed as a toothed rack along the passage direction in relation to the center console 10, the electric motor 92 is moved, in particular rotated, so that the provided gearing 94 of the actuator 18 is actuated. The parking lock is thus deactivated. In this case, the push rod is pushed in a first direction coinciding with the passage direction, which is illustrated in FIG. 5a by an arrow 98, whereby the parking lock is deactivated. If the push rod is translationally moved in a second direction, which is opposite to the first direction and illustrated by an arrow 100 in FIG. 5a, in particular in relation to the housing 30 and/or in relation to the center console 10, the parking lock is thus reactivated.

The gearwheel 88 is used, for example, as the release gearing or as part of the release gearing, wherein, by means of the release gearing, the parking lock can be manually and mechanically released by means of the tool 32. It is conceivable in this case that, for example, the gearwheel 88 is pressed onto the electric motor 92 or onto a corresponding gearwheel 102 of the release gearing by means of the tool 32, so that the release gearing does not always actively also run when the parking lock is deactivated by means of the electric motor 92. In this way, the tool 32 could be permanently installed and/or held at least indirectly, in particular directly, on the center console 10.

Figure 5B:
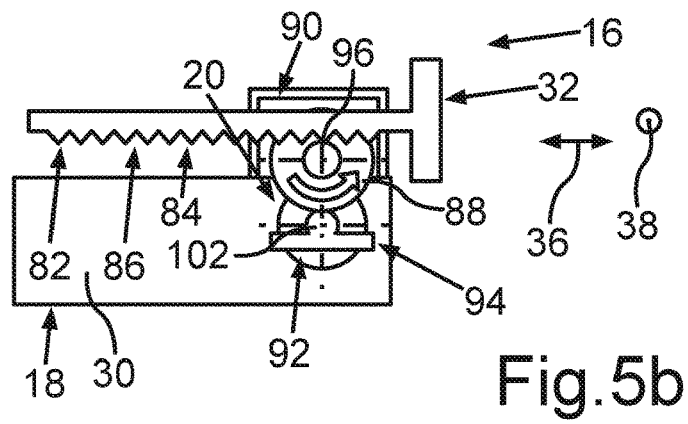
FIG. 5b shows a detail of a schematic sectional view of the actuating device according to a second embodiment.
Figure 5C:
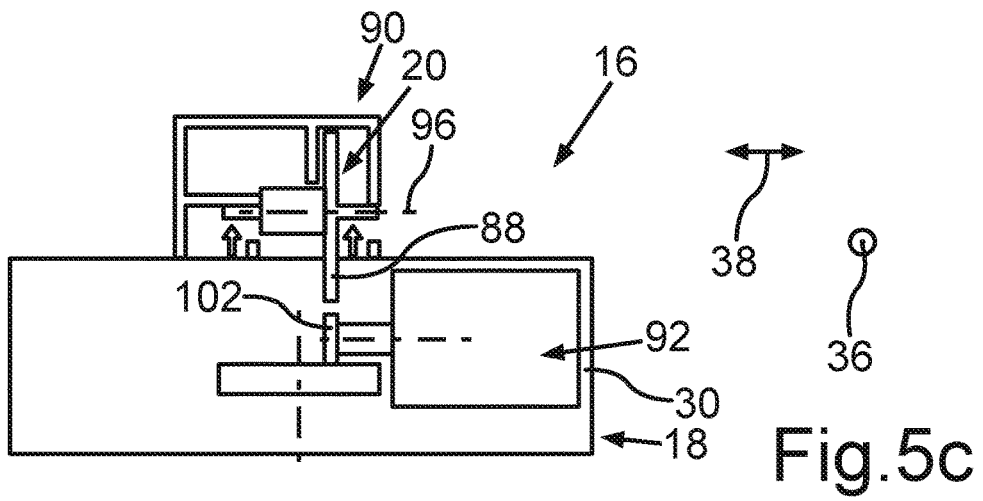
FIG. 5c shows a detail of a schematic sectional view of the actuating device according to the second embodiment.
Figure 5D:
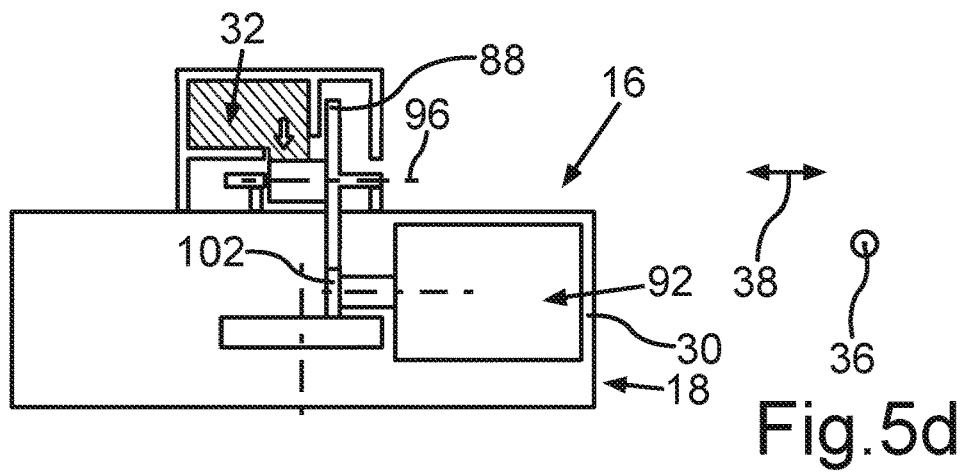
FIG. 5d shows a detail of a schematic sectional view of the actuating device according to the second embodiment.

It is illustrated in FIG. 5b that the gearwheels 88 and 102 are rotated accordingly when the push rod is pushed in the first direction. FIG. 5c shows the actuating device 16 of the second embodiment in an idle position in which, for example, the push rod does not interact with the gearwheel 88. In the idle position, the gearwheel 88 is decoupled from the gearwheel 102 and thus from the electric motor 92, so that when the parking lock is deactivated by means of the electric motor 92, the gearwheel 88 is not rotated by means of the electric motor 92. If now, however—as illustrated in FIG. 5d—the push rod (tool 32) is brought into interaction with the gearwheel 88 (actuating element 20), the gearwheel 88 is thus coupled to the gearwheel 102. As a result, the electric motor 92 is actuated, in particular rotated, via the gearwheel 102 and the gearwheel 88 by the push rod, whereby, for example, the parking lock is deactivated.

Figure 6:
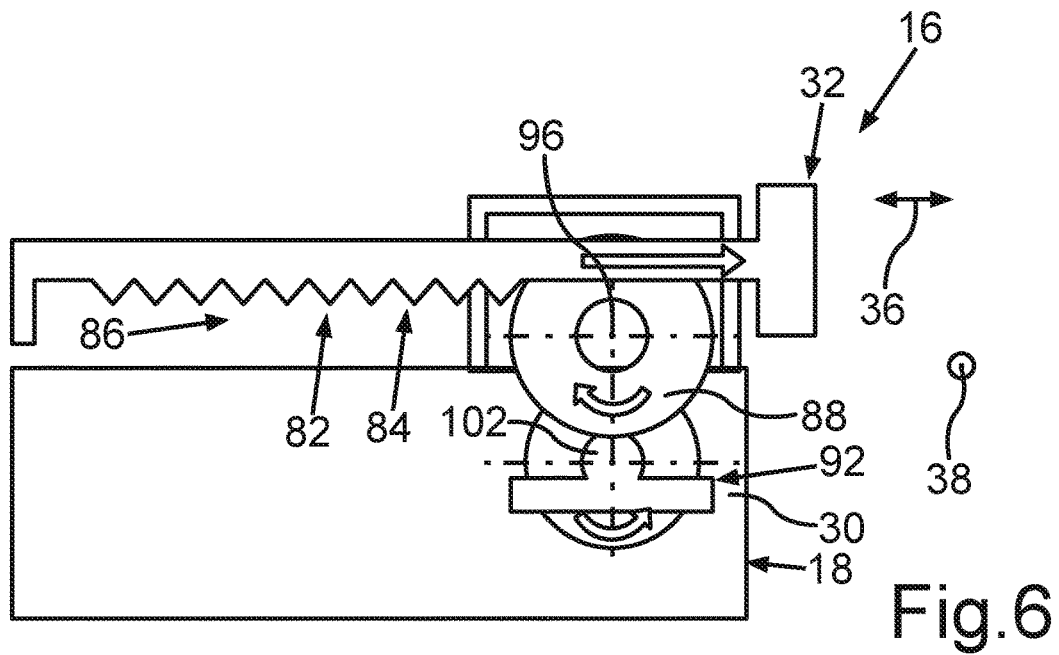
FIG. 6 shows a detail of a schematic side view of a tool of the actuating device according to a third embodiment.

FIG. 6 shows a third embodiment, in which the push rod is pulled out of the center console 10 to deactivate the parking lock. In contrast thereto, it is provided in the second embodiment that the push rod is pushed into the center console 10 to deactivate the parking lock. In the third embodiment, for example, a functional principle is thus provided that opposes the functional principle of the second embodiment, in particular with respect to the direction in which the tool 32 is to be translationally moved to deactivate the parking lock. In particular, the tool 32 allows an unpowered actuation and in particular deactivation of the parking lock.

The release gear is used to implement revolutions required for the deactivation of the parking lock, in particular of the electric motor 92 and/or its rotor. Via the release gear, the existing electric motor 92 is moved by mechanical work, which is provided, for example, via the tool 32 and transferred to the release gear.

The second and third embodiments are to be regarded as separate aspects or subjects independent of the other embodiments and exemplary embodiments and can thus represent intrinsic, separate, and independent inventions.

FIGS. 7a-e illustrate a fourth embodiment of the actuating device 16. In the fourth embodiment, the tool 32 is also formed as a push rod, wherein the formfitting device 82 comprises a recess 106, arranged on a frontal end face 104 of the push rod, for catching and accommodating the actuating element 20. If the push rod is pushed along the passage direction through the through opening 34 and thereby inserted into the center console 10, the actuating element 20 is thus captured by the push rod via the recess 106 and drawn to the rear by the thrust movement of the push rod and/or moved into the release position.

In this case, at least one first detent element 108 is held on the push rod. A second detent element 110 corresponding to the detent element 108, with which the detent element 108 can be locked, is provided on the actuator 18, in particular its housing 30, and/or on the center console 10.

Figure 7A:
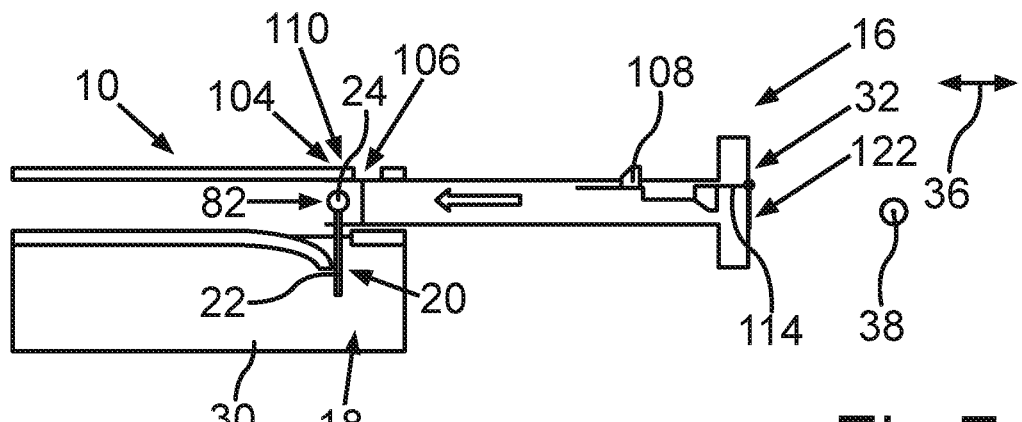
FIG. 7a shows a detail of a schematic and sectional side view of the actuating device according to a fourth embodiment.
Figure 7B:
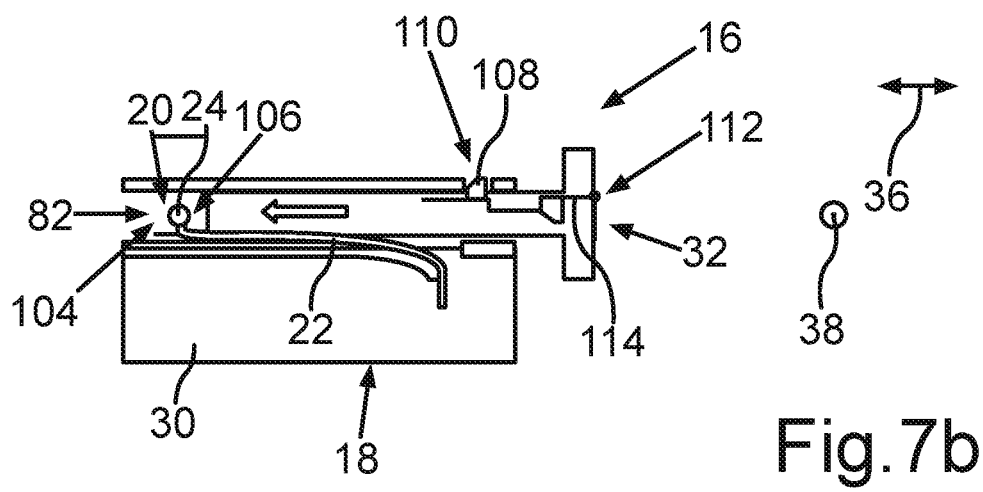
FIG. 7b shows a detail of a schematic and sectional side view of the actuating device according to a fourth embodiment.
Figure 7C:
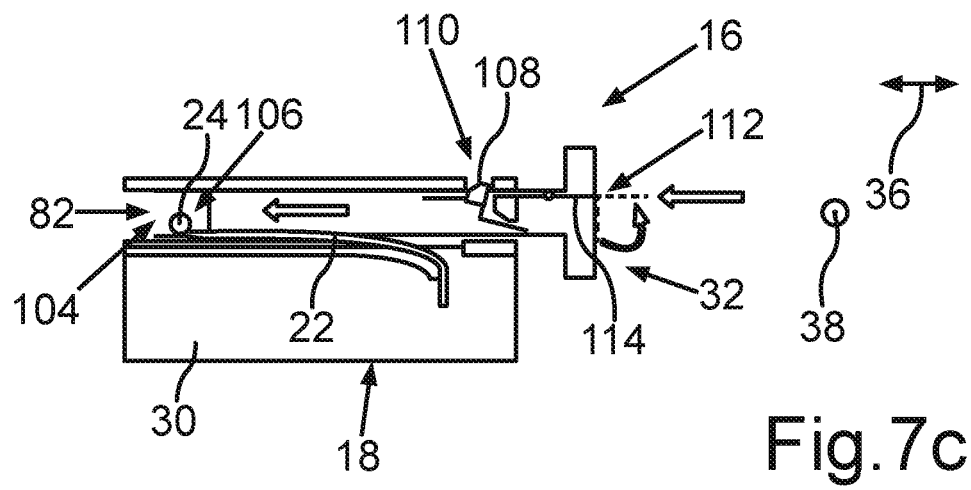
FIG. 7c shows a detail of a schematic and sectional side view of the actuating device according to a fourth embodiment.

It is apparent in FIG. 7b that the detent element 108 engages in the detent element 110, whereby the detent elements 108 and 110 interact in a formfitting manner. The actuating element 20 can thus be held in the release position.

To disengage the detent elements 108 and 110 from one another, a lever actuation unit 112 is provided. The lever actuation unit 112 comprises at least one lever 114 held pivotably on the push rod, by means of which, for example, the detent elements 108 and 110 can be disengaged from one another. For this purpose, for example, the detent element 108 is moved, for example, by means of the lever 114, out of the detent element 110, which is formed as a recess, for example. As a result, the push rod can be pulled out of the center console 10. The actuating element 20 can thus move from the release position, whereby the parking lock is reactivated. The detent elements 108 and 110 are thus in particular disengaged from one another by means of the lever actuation unit 112 in that the lever actuation unit 112 is unfolded and pushed toward the catch element 108. In this way, for example, the lever 114 presses the detent element 108 downward and out of the detent element 110.

Figure 7D:
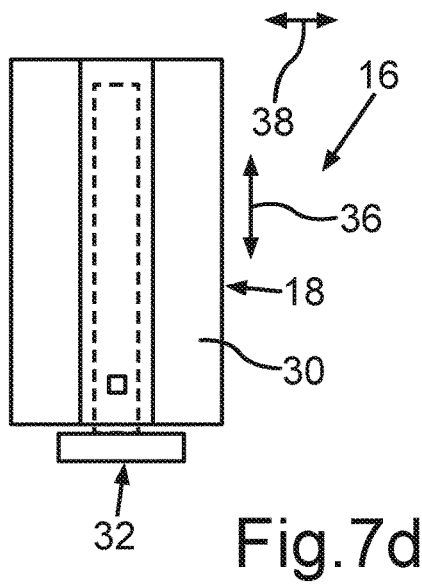
FIG. 7d shows a detail of a schematic top view of the actuating device according to a fourth embodiment.
Figure 7E:
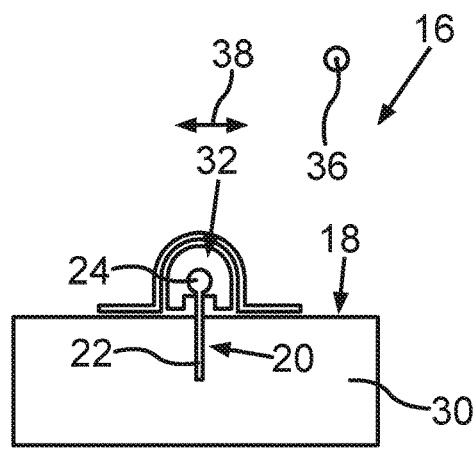
FIG. 7e shows a detail of a schematic rear view of the actuating device according to the fourth embodiment.

FIG. 7d shows the push rod according to the fourth embodiment in a state in which the parking lock is deactivated. FIG. 7e shows the actuating device 16 according to the fourth embodiment in a rear view.

Figure 8A:
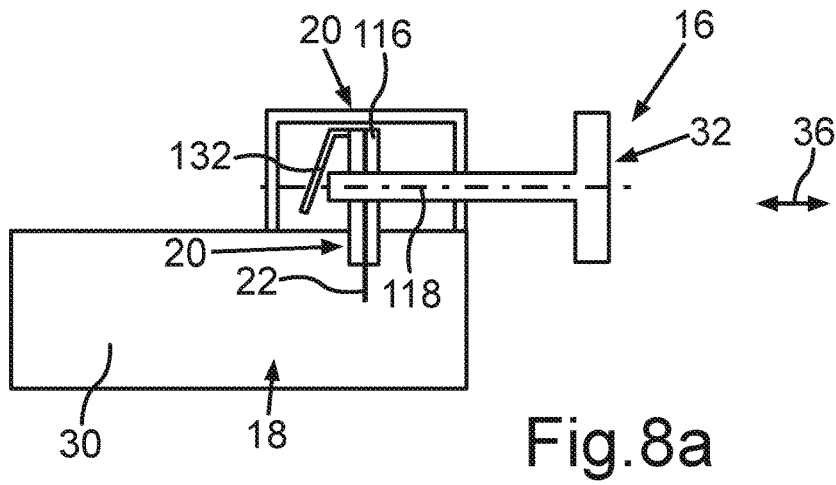
FIG. 8a shows a detail of a schematic and sectional side view of the actuating device according to a fifth embodiment.
Figure 8B:
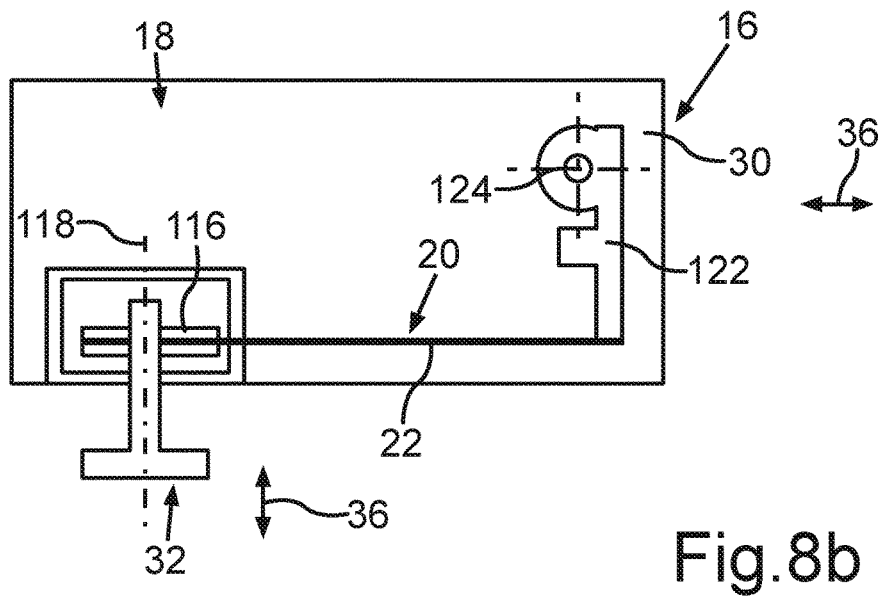
FIG. 8b shows a detail of a schematic top view of the actuating device according to the fifth embodiment.
Figure 8C:
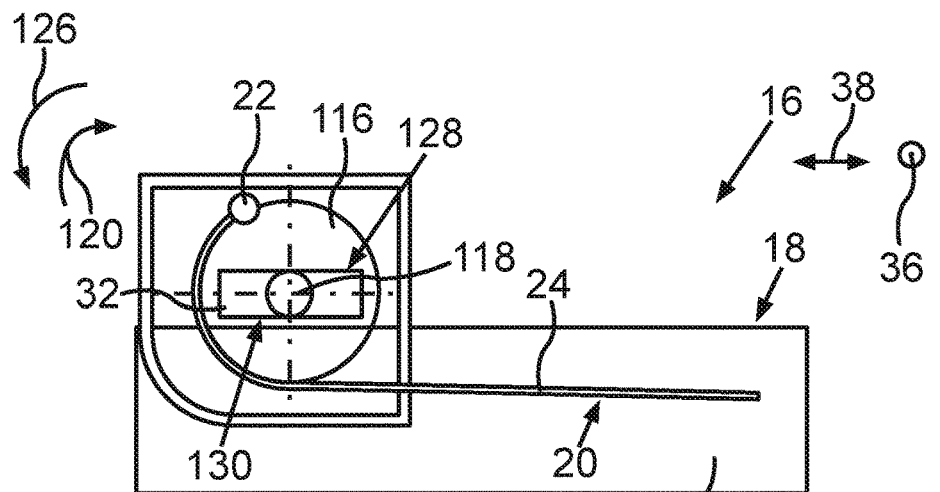
FIG. 8c shows a detail of a schematic and sectional side view of the actuating device according to the fifth embodiment.

FIGS. 8a-c show a fifth embodiment of the actuating device 16. In the fifth embodiment, a roller 116 is provided which is, for example, rotatably held on the actuator 18, in particular the housing 30. The roller 116 can be rotated around an axis of rotation 118 in relation to the housing 30. The tool 32 is, for example, formed as a push rod and/or as a key, wherein the tool 32 and the roller 116 are components formed separately from one another, for example. In particular, the roller 116 can be part of the actuating element 20. As is apparent from FIG. 8c, for example, the cable pull 22 is connected in a formfitting manner to the roller 116 via the fitting 24. If the roller 116 is rotated around the axis of rotation 118 in a first rotational direction illustrated by an arrow 120 in FIG. 8c, the cable pull 22 is thus pulled. In this way, for example, a lever 122 apparent from FIG. 8b is pivoted. The lever 122 is, for example, pivotably held on the housing 30 and can be pivoted around a pivot axis 124 in relation to the housing 30. By rotating the roller 116, the parking lock can be deactivated. If the roller 116 is then, for example, rotated in a second rotational direction opposite to the first rotational direction and illustrated by an arrow 126 in FIG. 8c, the parking lock is thus reactivated.

To be able to rotate the roller 116 by means of the tool 32 around the axis of rotation 118, for example, the tool 32 is inserted into a corresponding recess 128 of the roller 116. The recess 128 is formed nonround on the inner circumference side, whereby a region 130 of the tool 32 is also formed nonround on the outer circumference side. The region 130 is inserted into the recess 128, whereby the tool 32 can interact in a formfitting manner with the roller 116 via the region 130 in the recess 128. Torques can thus be transmitted from the tool 32 to the roller 116, by means of which the roller 116 can be rotated in the first rotational direction in relation to the housing 30. The insertion of the tool 32 into the roller 116 and/or into the recess 128 is particularly apparent from FIG. 8b.

A pawl 132, which is apparent from FIG. 8a, is furthermore provided, by means of which the roller 116 can be secured against a rotation around the axis of rotation 118 in relation to the housing 30. If the push rod (tool 32) formed as a key, for example, is inserted into the roller 116, in particular the recess 128, the pawl 132 is thus activated, whereby the pawl 132 secures the roller 116 against the rotation and the second rotational direction, in particular in a formfitting manner. The roller 116 thus cannot rotate in the second rotational direction while the tool 32 is inserted into the roller 116. If the tool 32 is pulled out of the roller 116, the pawl 132 is thus disengaged or deactivated, so that the roller 116 can then rotate in the second rotational direction. The parking lock can thus be reactivated. It is apparent from FIGS. 8a-c that the axis of rotation 118 extends in the plane spanned by the vehicle longitudinal direction and the vehicle transverse direction and at the same time in the vehicle transverse direction, so that, for example, the axis of rotation 118 coincides with the passage direction. The roller 116 is thus formed as a upright roller.

FIGS. 9a-d show a sixth embodiment, which in particular differs from the fifth embodiment in that the roller 116 is formed as a horizontal roller. The rotational axis 118 extends perpendicularly to said plane here, and at the same time in particular in the vehicle vertical direction. Furthermore, it is particularly apparent from FIGS. 9a, b that the roller 116, which is formed as a disk, for example, can be locked by means of the pawl 132, in particular in its end position. If the tool 32 is withdrawn from the through opening 34 and/or from the center console 10, the roller 116 is thus released, whereupon the parking lock can be reactivated.

Figure 9A:
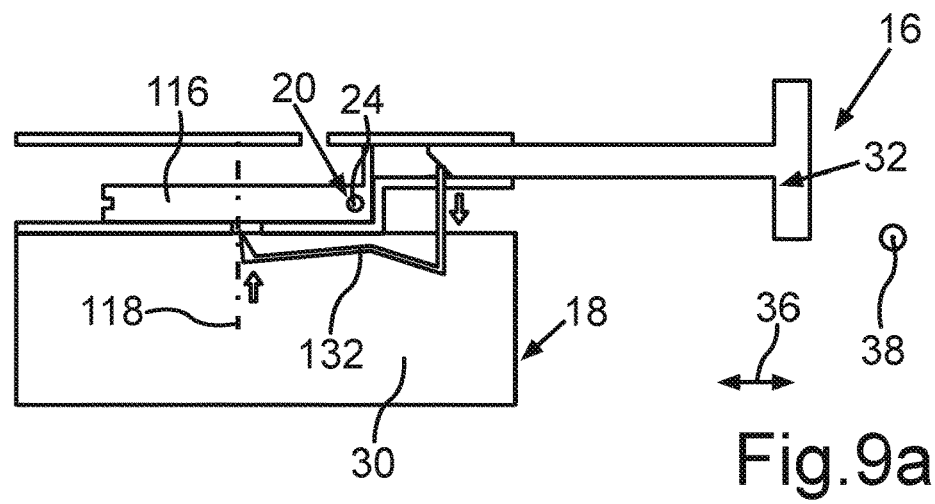
FIG. 9a shows a detail of a schematic and sectional side view of the actuating device according to a sixth embodiment.
Figure 9B:
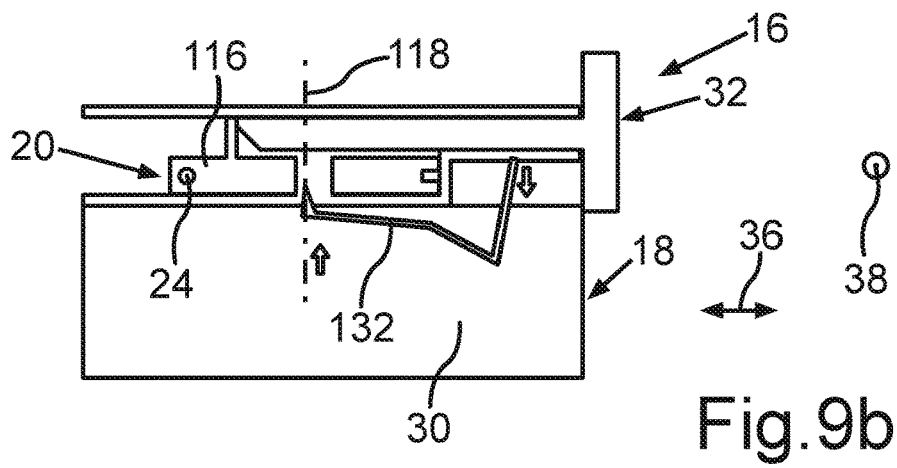
FIG. 9b shows a detail of a schematic and sectional side view of the actuating device according to a sixth embodiment.
Figure 9C:
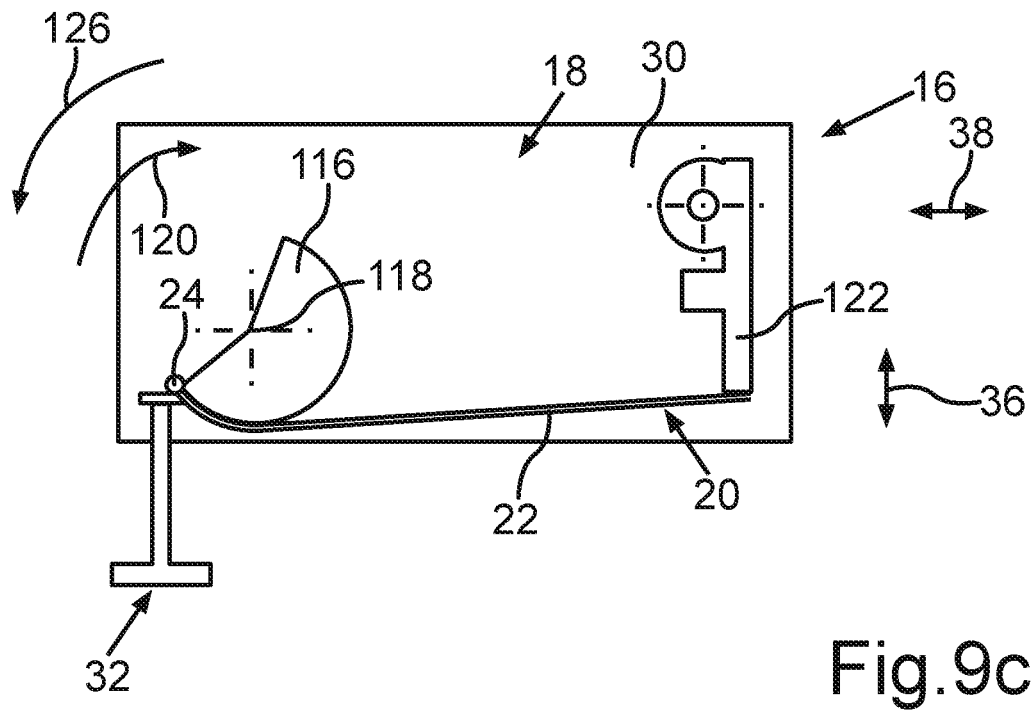
FIG. 9c shows a detail of a schematic top view of the actuating device according to the sixth embodiment.
Figure 9D:
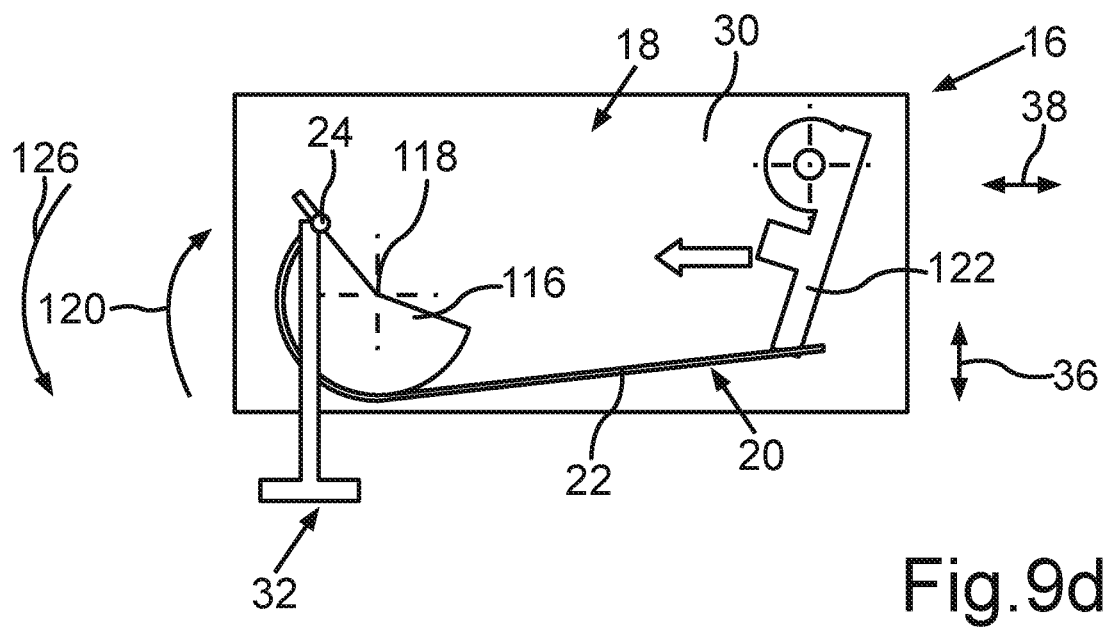
FIG. 9d shows a detail of a schematic top view of the actuating device according to the sixth embodiment.

It is apparent from FIGS. 9c, d that in the sixth embodiment, the roller 116 is, for example, rotated around the axis of rotation 118 in that the tool 32 is displaced along the passage direction in relation to the center console 10. This displacement of the tool 32 is converted into a rotation of the roller 116. In contrast thereto, it is provided in the fifth embodiment that the tool 32 is rotated around the axis of rotation 118 in relation to the center console 10 in order to rotate the roller 116 in relation to the center console 10 and as a result to deactivate the parking lock.

In other words, it is provided in the sixth embodiment that the tool 32, which is designed as part of a vehicle toolkit, for example, presses on the horizontal roller 116, to thus move the actuating element 20 into the release position. Upon insertion of the tool 32, the pawl 132 is actuated, whereby the rotation of the roller 116 in the second rotational direction is prevented. Upon withdrawal of the tool 32, the pawl 132 is disengaged, whereby the roller 116 can rotate back in the second rotational direction.

Figure 10A:
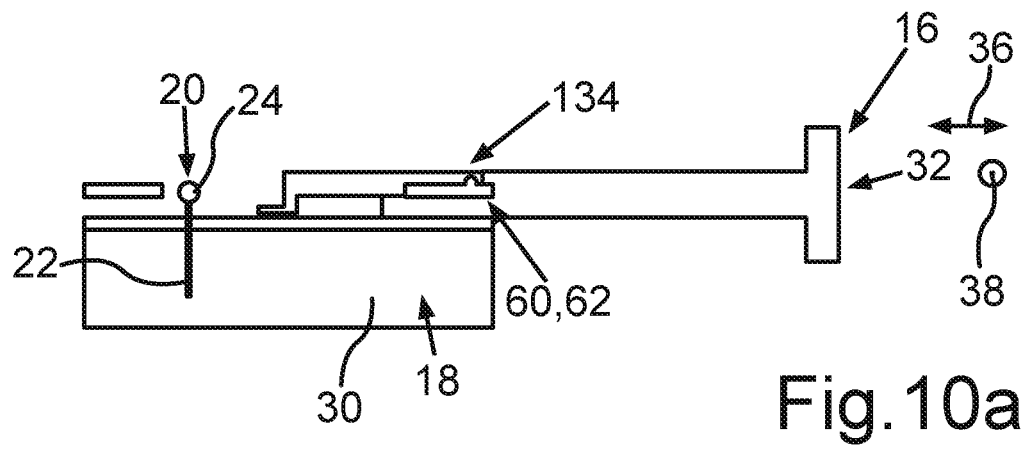
FIG. 10a shows a detail of a schematic and sectional side view of the actuating device according to a seventh embodiment.
Figure 10B:
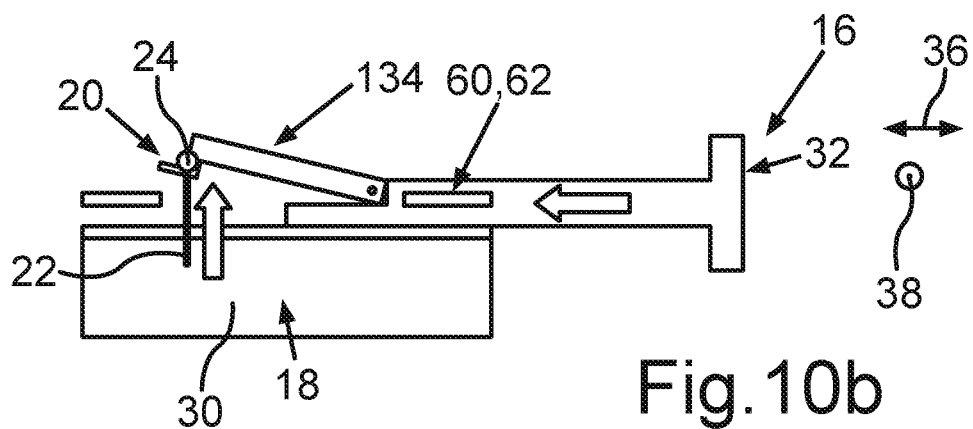
FIG. 10b shows a detail of a schematic and sectional side view of the actuating device according to a seventh embodiment.
Figure 10C:
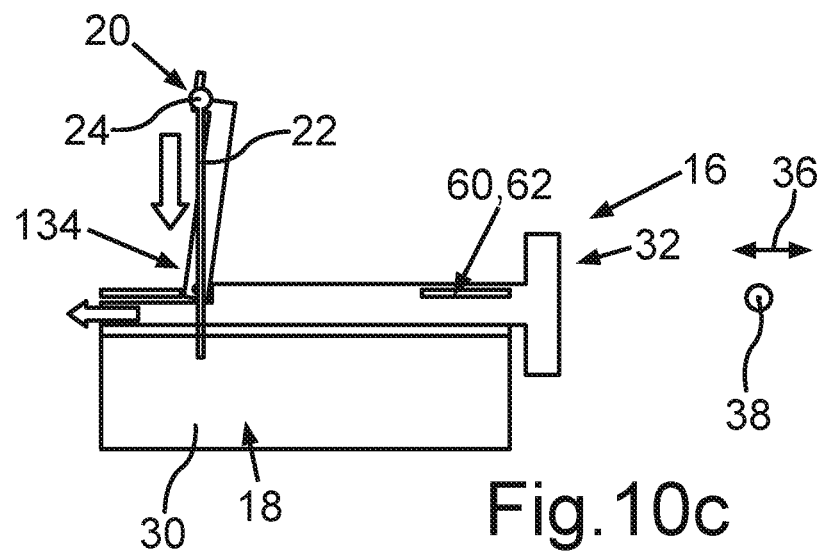
FIG. 10c shows a detail of a schematic and sectional side view of the actuating device according to a seventh embodiment.
Figure 10D:
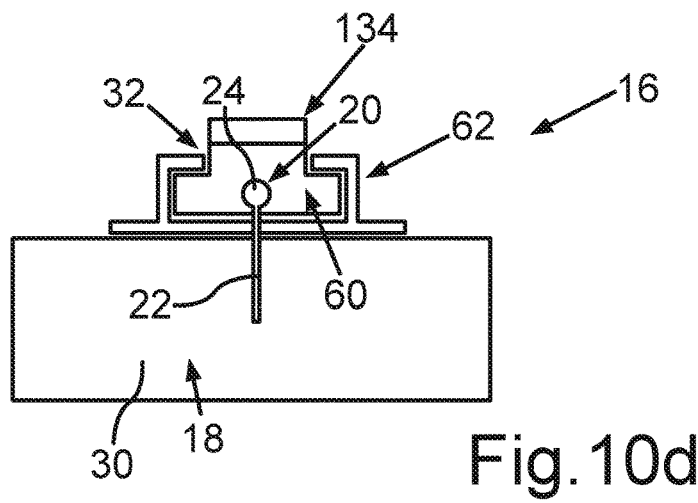
FIG. 10d shows a detail of a schematic and sectional rear view of the actuating device according to the seventh embodiment.
Figure 10E:
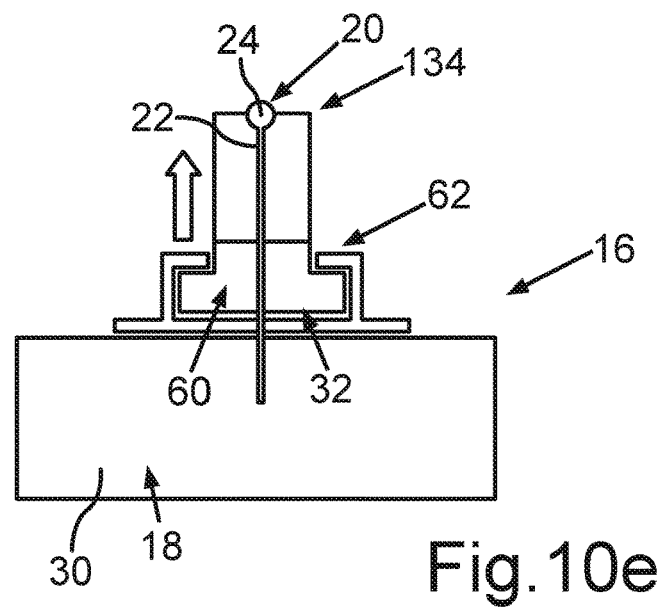
FIG. 10e shows a detail of a schematic and sectional rear view of the actuating device according to the seventh embodiment.

FIGS. 10a-c show a seventh embodiment of the actuating device 16. In the seventh embodiment, the tool is, for example, again formed as a push rod, on which a toggle lever 134 is provided. In other words, for example, in the seventh embodiment, the tool 32 comprises at least one toggle lever 134 for actuating the actuating element 20. The actuation of the actuating element 20 by means of the toggle lever 134 is particularly apparent from FIGS. 10b-e. The actuating element 20 is captured by the toggle lever 134 and pulled upward by the thrust movement of the tool 32. In an end position, for example, the toggle lever 134 has a top dead center position, whereby the actuating element 20 is held automatically in the release position. This top dead center position is particularly apparent from FIG. 10c. The parking lock can thus in particular only be reactivated in that the tool 32 is actively withdrawn from the center console 10. An activation of the parking lock caused by the actuating element 20 or by the parking lock itself can thus be avoided.

Figure 11A:
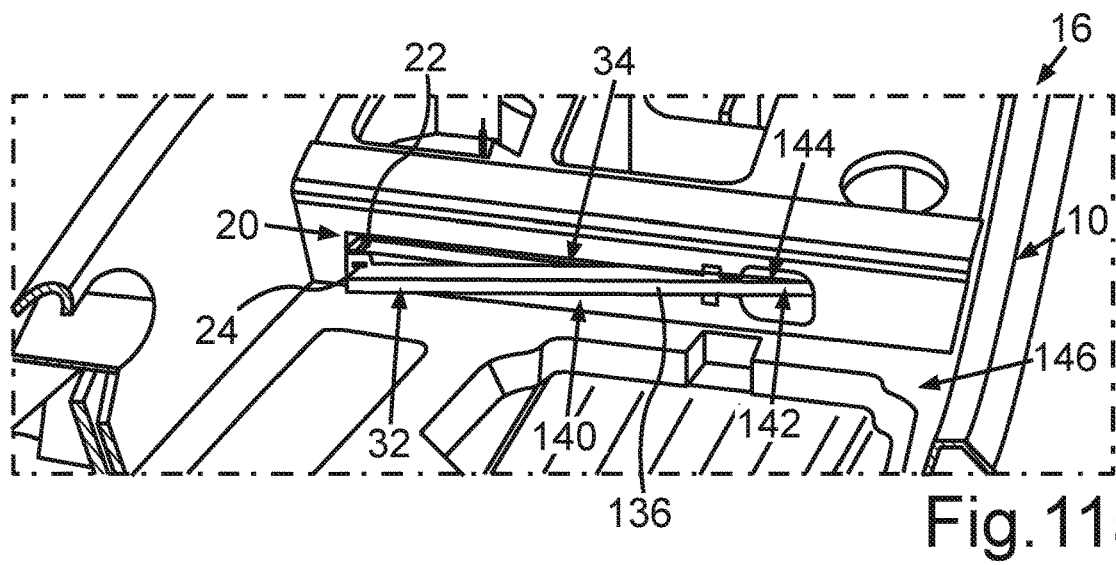
FIG. 11a shows a detail of a schematic perspective view of the actuating device according to an eighth embodiment.

FIGS. 11a, b show an eighth embodiment of the actuating device 16. In the eighth embodiment, the tool 32 is formed as a vehicle-fixed tool which is held at least indirectly, in particular, directly on the center console 10. In this case, the tool 32 comprises a lever 136, which is held on the center console 10 so it is pivotable around a pivot axis in relation to the center console 10. The pivot axis extends perpendicularly here to the plane spanned by the vehicle transverse direction and the vehicle longitudinal direction and at the same time in the vehicle vertical direction. The through hole 34 extends here in a plane which is spanned by the vehicle transverse direction and the vehicle vertical direction. It is apparent from FIGS. 11a, b that the lever 136 is movable, in particular pivotable, for example, in relation to the center console 10 from a starting position into at least one actuation position B shown in FIG. 11b. In the actuation position B, for example, the actuating element 20 connected to the lever 136 is actuated, whereby the parking lock is released. In this case, for example, the lever 136 penetrates the through opening 34 at least in the actuation position B.

Figure 11B:
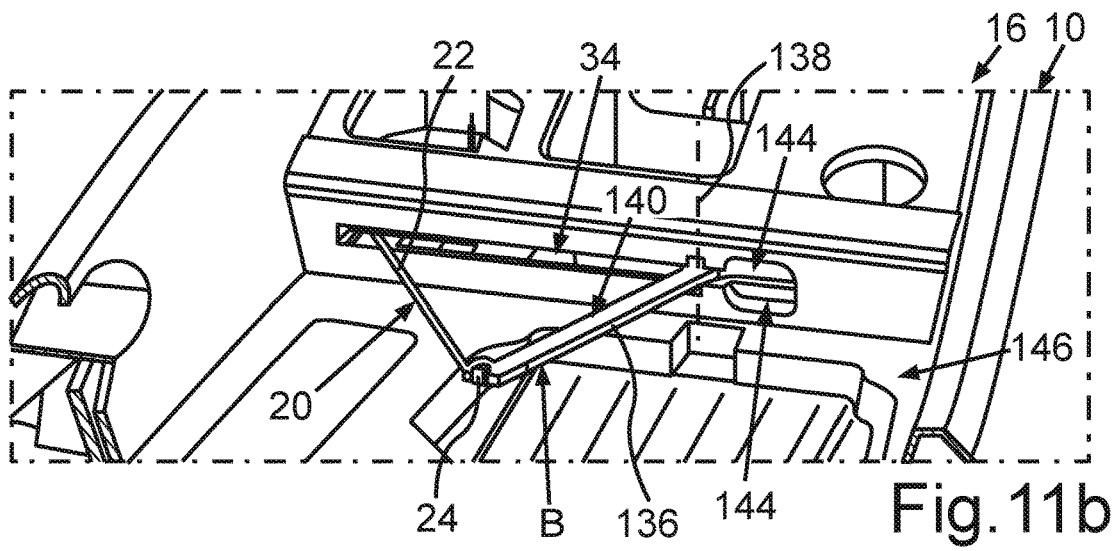
FIG. 11b shows a detail of a schematic perspective view of the actuating device according to an eighth embodiment.

The pivot axis mentioned is shown in FIG. 11b and identified therein by 138. It is particularly apparent here from FIG. 11b that the lever 136 comprises a first longitudinal region 140 and a second longitudinal region 142. The pivot axis 138 is situated here between the longitudinal regions 140 and 142. The longitudinal region 142 is associated here, for example, with a recess 144 formed as an indentation. For example, if a force acting in the direction of the center console 10, in particular a pressure force is exerted on the longitudinal region 142, the lever 136 is thus pivoted somewhat out of its starting position into a gripping position shown in FIG. 11a around the pivot axis 138 in relation to the center console 10. The pressure force is, for example, exerted on the longitudinal region 142 in that a person presses with their thumb in the recess 144 and at the same time on the longitudinal region 142. In the gripping position, the person can grasp or enclose the longitudinal region 140 with their hand and pivot the lever 136 into the actuation position, whereby the actuating element 20 is pulled upon and the parking lock is deactivated. In other words, the lever 136 is released by thumb pressure in the indentation, so that, for example, the index and middle fingers of the person can reach behind the longitudinal region 140. Using the index and middle fingers, a rotational movement of the lever 136 into the actuation position B can be effectuated, whereby, for example, the actuating element 20 is pulled by 100 mm. The parking lock is thus deactivated. In this way, the parking lock can be deactivated without having to remove the center console 10. Furthermore, in the eighth embodiment, the cable pull 22 and/or the actuating element 20 can be guided in the interior 12. The through hole 34 is in this case an access which is integrated in the eighth embodiment into a front storage shell 146 of the center console 10.

Figure 12A:
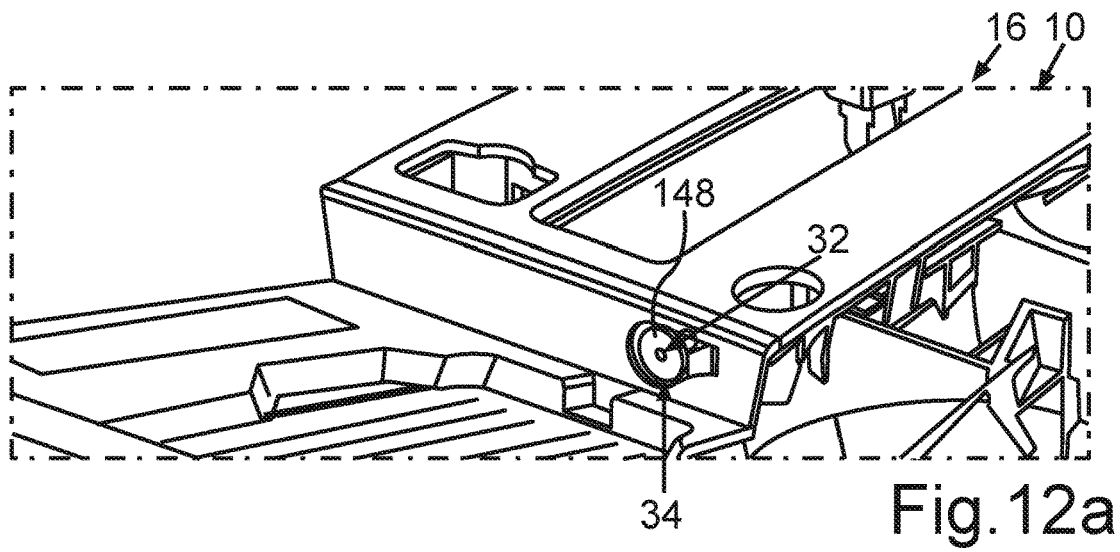
FIG. 12a shows a detail of a schematic perspective view of the actuating device according to a ninth embodiment.
Figure 12B:
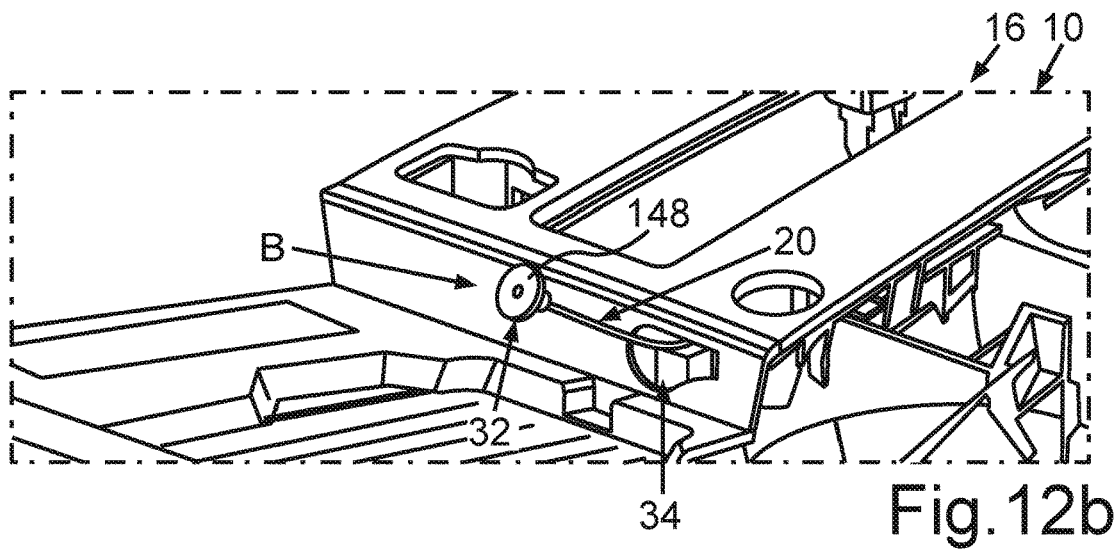
FIG. 12b shows a detail of a schematic perspective view of the actuating device according to a ninth embodiment.

Finally, FIGS. 12a, b show a ninth embodiment, in which the tool 32 is also designed as a vehicle-fixed tool. The tool 32 is designed here as an operating element in the form of a knob 148, which is connected to the actuating element 20. In a starting position shown in FIG. 12a, the knob 148 is accommodated in the corresponding through opening 34. To deactivate the parking lock, the knob 148 is pulled out of the through opening 34 and moved, in particular pulled, into an actuation position B shown in FIG. 12b. In this way, the actuating element 20 is pulled, whereby the parking lock is deactivated.

In the ninth embodiment, the through opening 34 is associated, for example, with a cover element formed in particular as a lid, by means of which the through opening 34 can be closed. After the cover element is taken out, for example, the knob 148 can be grasped by a person and pulled, for example, by 100 mm out of the through opening 34 to thus pull the actuating element 20 and as a result to deactivate the parking lock. The knob 148 is, for example, a holder also formed as a multifunction holder, on which objects can be held or suspended, for example. In the ninth embodiment, a fixing device not shown in the figure can be provided, by means of which, for example, the actuated actuating element 20, in particular the cable pull 22, can be fixed in its actuated position, in particular in relation to the center console 10. An inadvertent and/or automatic activation of the parking lock can thus be avoided.

The invention claimed is:

1. An actuating device for actuating an emergency release of a transmission of a motor vehicle, comprising:
   a parking lock which mechanically locks the transmission when the parking lock is activated,
   at least one vehicle-supported actuating element by which the parking lock is manually and mechanically deactivatable, and
   a tool formed separately from the actuating element, via which the actuating element is manually and mechanically actuatable to manually deactivate the parking lock,
   wherein the actuating element comprises a roller, which is rotatable around an axis of rotation, and a cable pull at least partially wrapped around the roller about the axis of rotation,
   wherein the tool is configured to engage with the actuating element such that when the tool is rotated about the axis of rotation, the roller is likewise caused to rotate about the axis of rotation, thereby actuating the actuating element,
   wherein a pawl is provided, the pawl movable between at least one blocking position and at least one release position,
   wherein, in the at least one blocking position, the roller is secured by the pawl against rotation around the axis of rotation in at least one rotational direction,
   wherein, in the at least one release position, the pawl releases the roller for rotation around the axis of rotation at least in the at least one rotational direction, and
   wherein the tool comprises at least one actuating region which moves the pawl from the at least one release position into the at least one blocking position when the tool engages the actuating element.

2. The actuating device as claimed in claim 1, wherein the actuating device further comprises at least one through opening and a passage direction,
wherein the through opening is formed in a center console arranged in an interior of the motor vehicle, and
wherein the passage direction extends in a plane defined by a vehicle transverse direction and a vehicle longitudinal direction, along which the at least one through opening is penetrable by the tool, thereby bringing the tool into cooperation with the actuating element to mechanically actuate the actuating element.

3. The actuating device as claimed in claim 2, wherein the passage direction extends in the vehicle transverse direction.

4. The actuating device as claimed in claim 2, wherein the tool is formed separately from the center console and is pushable along the passage direction through the through opening to thus bring the tool into cooperation with the actuating element.

5. The actuating device as claimed in claim 2, wherein the tool is designed as a vehicle-supported tool, which is at least indirectly held on the center console and penetrates the through opening in at least one position, into which the tool is movable.

6. The actuating device as claimed in claim 1, wherein the axis of rotation extends, in an installed position of the actuating device, in a plane defined by a vehicle transverse direction and a vehicle longitudinal direction.

7. The actuating device as claimed in claim 1, wherein the axis of rotation extends, in an installed position of the actuating device, in a vehicle vertical direction.

8. The actuating device as claimed in claim 1, wherein the pawl, in the at least one blocking position, permits rotation of the roller around the axis of rotation in a second rotational direction opposite to the at least one rotational direction.

9. The actuating device as claimed in claim 3, wherein the tool is formed separate from the center console and is pushable along the passage direction through the through opening, to thus bring the tool into cooperation with the actuating element.

10. The actuating device as claimed in claim 3, wherein the tool is designed as a vehicle-supported tool, which is at least indirectly held on the center console and penetrates the through opening in at least one position, into which the tool is movable.

11. The actuating device as claimed in claim 2, wherein the axis of rotation extends, in an installed position of the actuating device, in the plane defined by the vehicle transverse direction and the vehicle longitudinal direction.

12. The actuating device as claimed in claim 3, wherein the axis of rotation extends, in an installed position of the actuating device, in the plane defined by the vehicle transverse direction and the vehicle longitudinal direction.

13. The actuating device as claimed in claim 4, wherein the axis of rotation extends, in an installed position of the actuating device, in the plane defined by the vehicle transverse direction and the vehicle longitudinal direction.

14. The actuating device as claimed in claim 5, wherein the axis of rotation extends, in an installed position of the actuating device, in the plane defined by the vehicle transverse direction and the vehicle longitudinal direction.

15. The actuating device as claimed in claim 2, wherein the axis of rotation extends, in an installed position of the actuating device, in a vehicle vertical direction.

16. The actuating device as claimed in claim 3, wherein the axis of rotation extends, in an installed position of the actuating device, in a vehicle vertical direction.

17. The actuating device as claimed in claim 4, wherein the axis of rotation extends, in an installed position of the actuating device, in a vehicle vertical direction.

18. The actuating device as claimed in claim 5, wherein the axis of rotation extends, in an installed position of the actuating device, in a vehicle vertical direction.

* * * * *